(12) United States Patent
Mochizuki

(10) Patent No.: US 6,804,018 B1
(45) Date of Patent: Oct. 12, 2004

(54) PRINTER AND ITS CONTROL METHOD FOR CREATING LINK INFORMATION BETWEEN A TRANSFER DATA POSITION AND A PRINT DATA POSITION

(75) Inventor: Mamoru Mochizuki, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/338,801

(22) Filed: Jun. 23, 1999

(30) Foreign Application Priority Data

Dec. 25, 1998 (JP) .......................................... 10/369067
Mar. 17, 1999 (JP) .......................................... 11/071416

(51) Int. Cl.$^7$ .......................... G06F 11/00; G06K 15/02
(52) U.S. Cl. ..................... 358/1.14; 358/1.15; 714/100; 714/2; 714/15; 714/18
(58) Field of Search ................ 358/1.1–1.9, 1.11–1.18; 714/2, 8, 6, 15, 16, 18, 100, 11, 12, 13; 382/309

(56) References Cited

U.S. PATENT DOCUMENTS

| | | | | |
|---|---|---|---|---|
| 4,058,838 A | * | 11/1977 | Crager et al. ............... 358/257 |
| RE31,182 E | * | 3/1983 | Crager et al. ................... 178/3 |
| 4,991,972 A | * | 2/1991 | Ikenoue et al. .............. 364/519 |
| 5,287,537 A | * | 2/1994 | Newmark et al. ........... 395/800 |
| 5,299,026 A | * | 3/1994 | Vincett et al. ............... 358/401 |
| 5,592,683 A | * | 1/1997 | Chen et al. .................. 395/872 |
| 5,625,757 A | * | 4/1997 | Kageyama et al. ........ 358/1.14 |
| 5,684,934 A | * | 11/1997 | Chen et al. ................. 358/1.14 |
| 5,768,483 A | * | 6/1998 | Maniwa et al. ............ 358/1.15 |
| 5,841,793 A | * | 11/1998 | Fukuda ..................... 371/37.01 |
| 5,906,442 A | * | 5/1999 | Kishida ........................ 400/61 |

* cited by examiner

*Primary Examiner*—King Y. Poon
(74) *Attorney, Agent, or Firm*—Westerman, Hattori, Daniels & Adrian, LLP

(57) ABSTRACT

On a page by page basis, a printer serves to print out in sequence print data transferred from a host connected thereto by way of a network. Every time receiving print data from the host, a link information creation unit of the printer creates and saves link information indicative of correlations between packets of print data received and pages on the printer side. In case a print error such as paper jam has occurred during the print out, a resend request unit recognizes from the link information the number of a packet to which a print page subjected to the print error corresponds, and issues a request for resend.

13 Claims, 28 Drawing Sheets

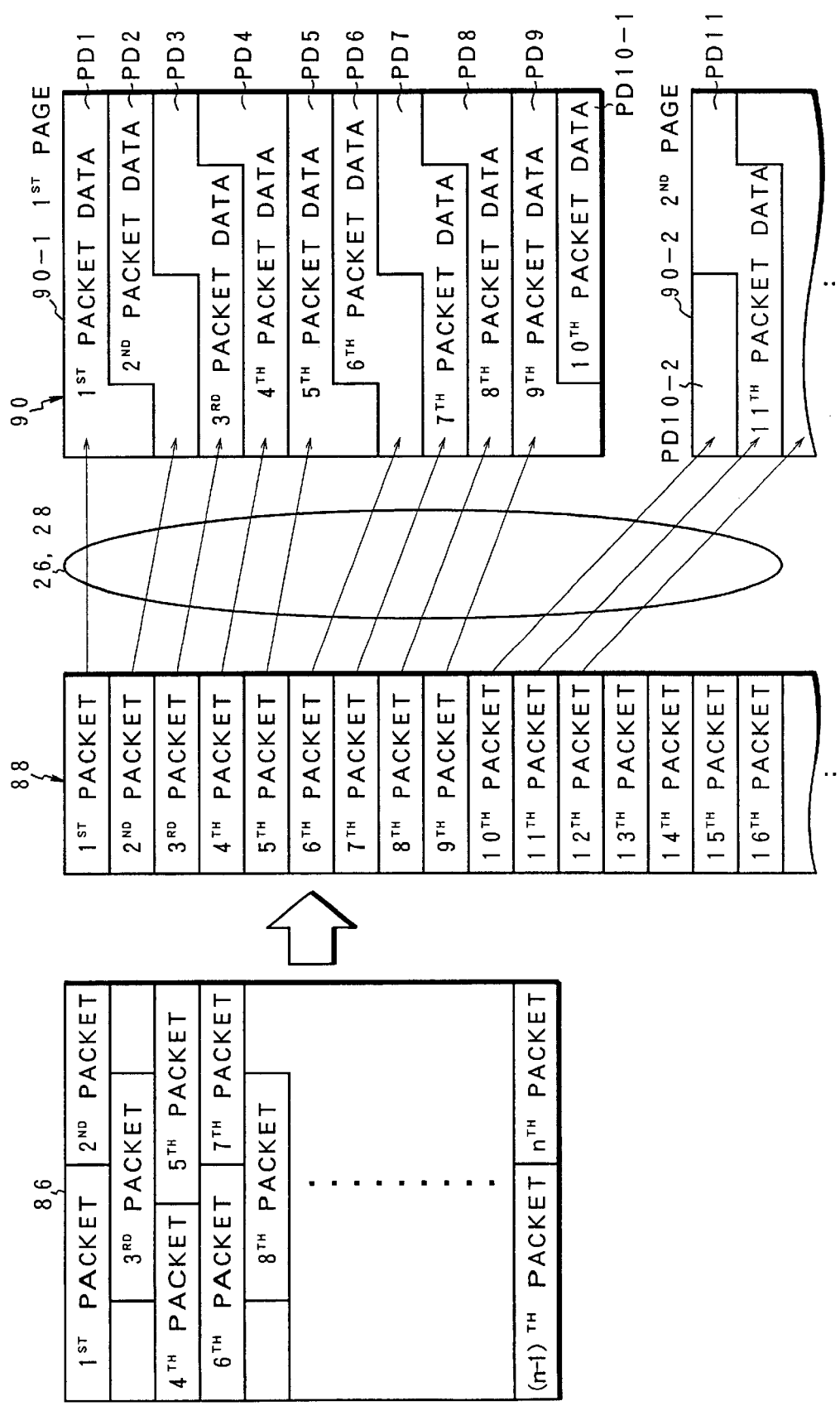
F I G. 8

| PAGE | PACKET NO. | OFFSET |
|---|---|---|
| 1 | P1 | 0 |
| 1 | P2 | 0 |
| 1 | P3 | 0 |
| 1 | P4 | 0 |
| 1 | P5 | 0 |
| ⋮ | ⋮ | ⋮ |
| 1 | P9 | 0 |
| 1 | P10 | 0 |
| 2 | P10 | B10 |
| 2 | P11 | 0 |

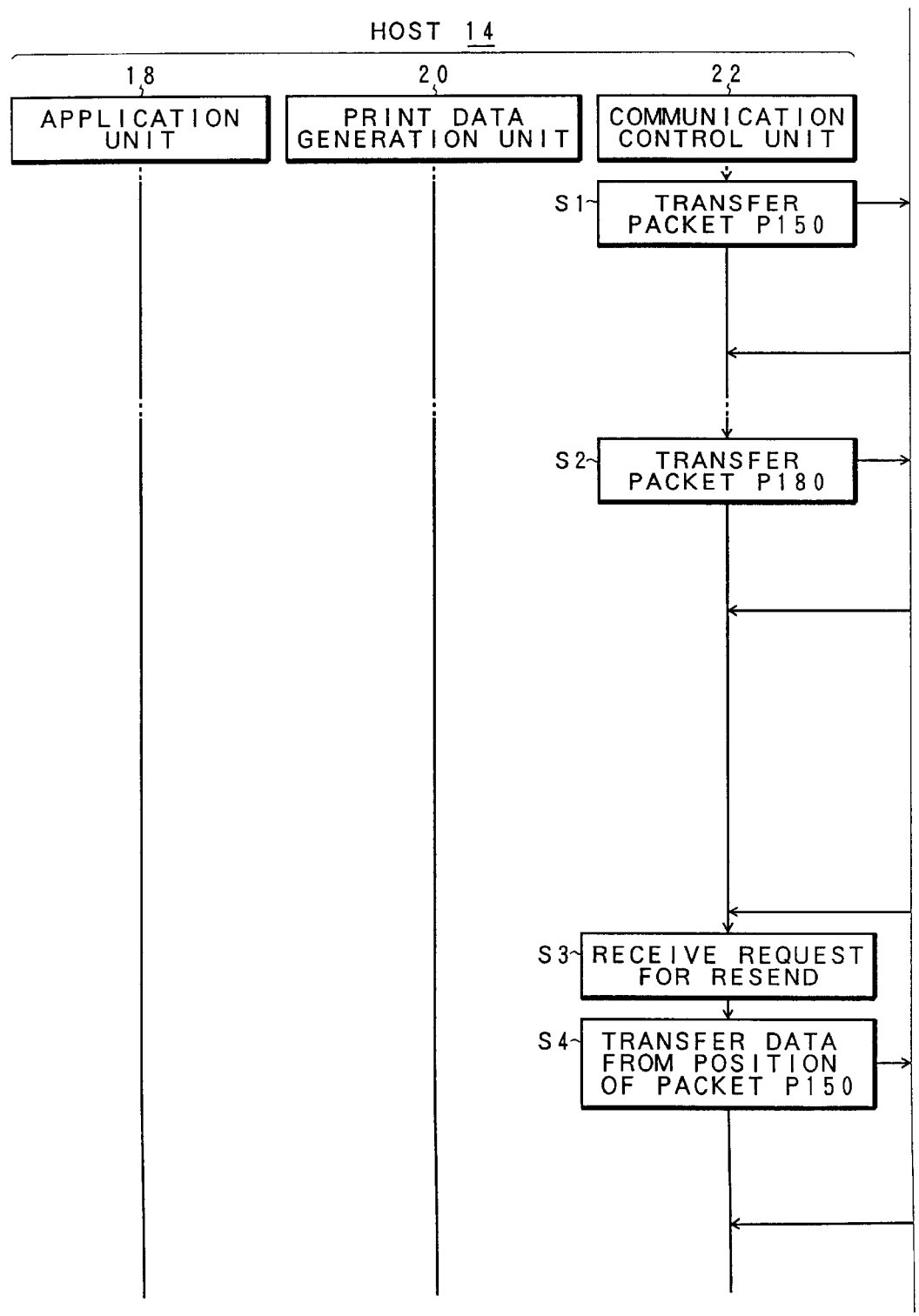

| PAGE | APPLICATION PACKET NO. | OFFSET |
|---|---|---|
| 1 | AP 1 | 0 |
| 1 | AP 2 | 0 |
| 1 | AP 3 | 0 |
| 1 | AP 4 | 0 |
| 2 | AP 4 | B 4 |
| ⋮ | ⋮ | ⋮ |

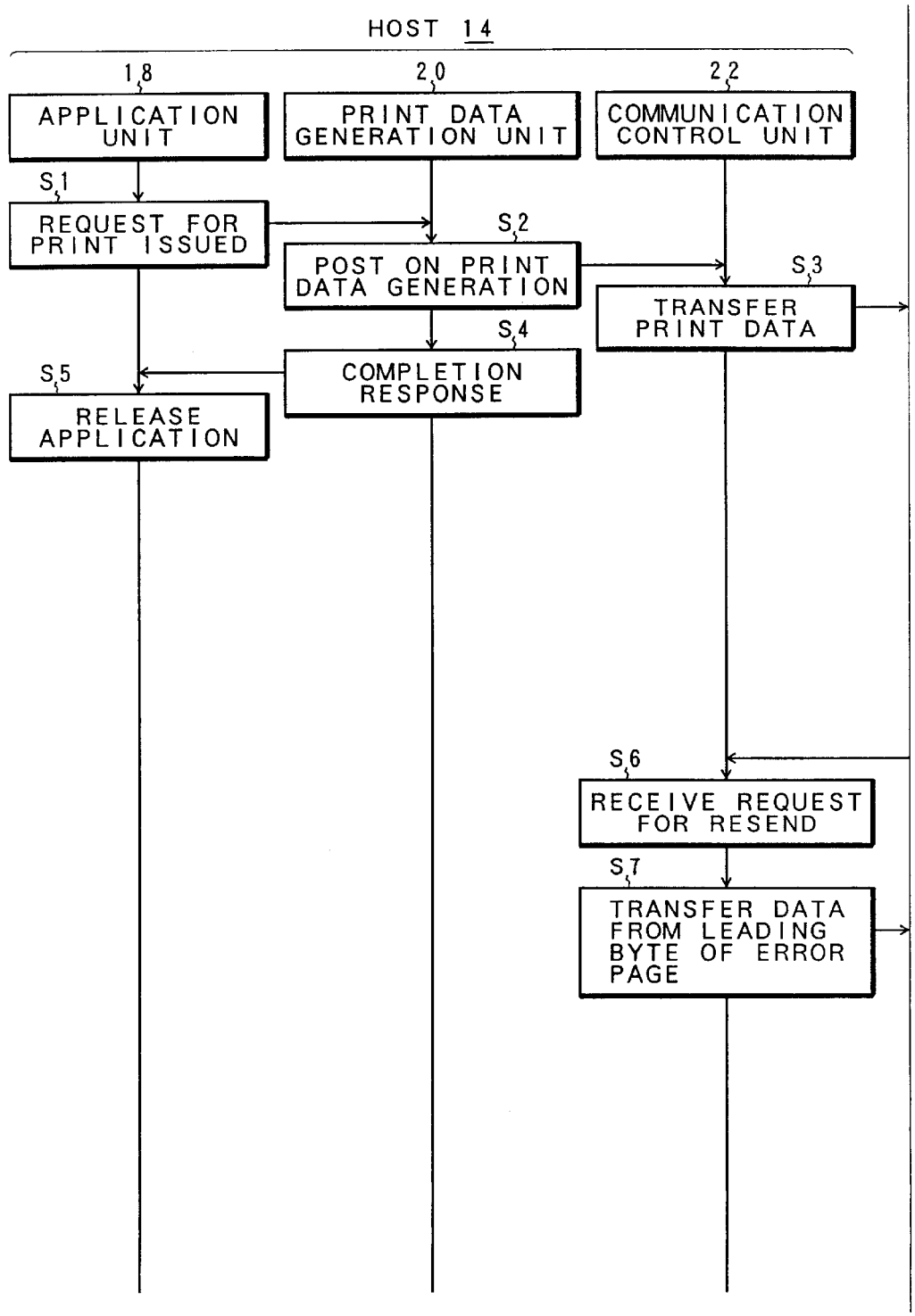

PRINTER AND ITS CONTROL METHOD FOR CREATING LINK INFORMATION BETWEEN A TRANSFER DATA POSITION AND A PRINT DATA POSITION

BACKGROUND OF THE INVENTION

1. Field of the Invention

The present invention relates generally to a printer for printing out in sequence, on a desired page by page basis, print data transferred from a host associated by way of a network, and to a method of controlling the printer as well as to a storage medium in which a printer control program is stored. More particularly, the invention relates to a network adaptable printer which upon the occurrence of a print error such as paper jam, issues a request for resend of print data to ensure print results, and to its control method as well as to a storage medium having a printer control program stored therein.

2. Description of the Related Arts

Up until now, network adaptable printer apparatuses designed to directly connected to Ethernet LAN or the like serve to print out, on a page by page basis, print data with print commands that have been transferred from a host such as a mainframe or a server to the printer apparatuses by way of the network. In such network adaptable printer apparatuses, the paper print out is executed after normal reception of print data from the host, although if an error such as paper jam has occurred during the print out, the host is posted on the print error in the form of status from the printer apparatuses so that data transfer from the host is interrupted. In such a case, even print data that have been normally received from the host may have to be discarded due to the occurrence of error depending on the control program creation method on the printer side or on the environment of memories or the like possessed by the printer. For this reason, in order to assure the print results in the event of occurrence of any print error, even print data that have once been normally transferred will need recovery due to resending. Following are known recovery methods that can be employed upon the occurrence of any error with the aim of assuring the print results in the conventional printers.

I. Method in which the operator again makes a request for print through the host when recovery factors such as print errors have occurred;

II. Method in which print data are simply resent from the head of the job when recovery factors such as print errors have occurred;

III. Method in which print data received by the printer are kept by the printer side until the paper is output, to thereby assure the data.

IV. Method in which a print protocol for printing allows management of output pages between the printer and the host so that, when any recovery is carried out as a result of occurrence of a recovery factor such as print error, the host resends page data to be reprint.

However, such conventional error recovery methods for network adaptable printer apparatuses will entail the following problems. First, the method I in which the operator again makes a request for print through the host upon the occurrence of any recovery factor such as print error, will need a reprint instruction of the operator and may possibly need reactivation of the application. Also, for example, in case the print data are not saved at the host application level, the data must inefficiently be again created. The method II in which the print data are simply resent from the head of the job upon the occurrence of any recovery factor, will inconveniently start the reprint from the head of the job without any intervention of the operator, resulting in output of a plurality of same pages. For example, if an error such as paper jam has occurred at page 90 of 100-page job, the entire job is resent so that the output results from pages 1 to 90 will be repeated in vain. Furthermore, the method III in which the print data received by the printer are retained by the printer side until the paper is output to assure the data, will need large capacity of memories on the printer side to retain the data, which leads to an increased cost. Furthermore, the method IV in which the print protocol allows management of output pages between the printer and the host so that, when any recovery factor such as print error has occurred, data to be reprint are resent through the judgment processing of the host, will pose additional burden on the processing and may possibly result in a reduced operation speed, since for the resend of designated page data, the host side must refer to the print data from its head to retrieve the designated page while being conscious of the commands of the print data. Naturally, if no consideration is paid to the recovery, there may arise a problematic skip of the pages subjected to the paper jam since the printing is performed continuously after the occurrence of paper jam for example.

SUMMARY OF THE INVENTION

According to the present invention, there is provided a printer which upon the occurrence of a print error, is capable of resending print data easily and rapidly without a need for the host side to be conscious of the content of the print data on the printer side, to implement effective error recovery.

The present invention is directed to a printer serving to print out in sequence, on a desired print data length basis, print data transferred from a host associated by way of a network such as LAN. The present invention in the form of such a network adaptable printer comprises a link information creation unit which, every time receiving print data from the host, creates and saves link information indicative of a correlation between a transfer data position on the host side of the print data received and a print data position on the printer side; and a resend request unit which, when a print error has occurred during the print out, recognizes from the link information a transfer data position on the host side corresponding to a print data position at which the print error has occurred, to thereby issue a resend request to the host. Such a printer of the present invention eliminates any need for the host side to be conscious of pages on the printer side through reference to print data upon data resend from the host, thereby achieving easy and rapid recovery on a page by page basis.

The link information creation unit, every time receiving a packet containing print data from the host, creates and saves link information indicative of a correlation between a packet position on the network and a print data position. In this case, the resend request unit, when a print error such as paper jam has occurred during the print out, recognizes from the link information a packet position on the network corresponding to a print data position subjected to the print error, to thereby issue a request to the host for resend of print data from the packet position recognized. The link information creation unit includes a packet counter for counting the packet count every time receiving a packet containing print data from the host, a page counter for counting the page count every time creating print data on a page by page basis through combination of print data contained in the packet received, and a control memory for storing as link information the packet count of the packet counter and the page count of the page counter. At that time, the resend request unit recognizes from the link information a packet position on the network corresponding to the foremost position of a print page subjected to the print error, to thereby issue a request to the host for resend of print data. The link information creation unit further includes an offset counter, e.g., a byte counter, for counting the offset indicative of a data position within a received packet. In cases where print data obtained from the received packet are separated into an endmost portion of the current page and a foremost portion of the next page, in other words, where the print data of the received packet extend over two adjacent pages, the link information creation unit saves as link information the page count of the current page and the packet count of the received packet, and it further saves as link information the page count of the next page, the packet number of the same received packet and the offset value of the offset counter. The resend request unit, when a print error has occurred during the print out of a page having at its foremost position partial print data of the received packet, recognizes from the link information a packet position on the network corresponding to the page subjected to the error and a transfer start position within the packet, to thereby issue a request to the host for resend of print data.

In another aspect of the printer according to the present invention, the link information creation unit, every time receiving print data from the host, creates and saves link information indicative of a correlation between a packet position, in the application layer of the host, of received print data and a print data position. In this case, the link information creation unit, when a print error such as paper jam has occurred during the print out, recognizes from the link information a packet position in the application layer corresponding to a print data position at which the print error has occurred, to issue a request to the host for resend of print data starting from the packet position recognized. In this manner, the recovery is achieved by resending data on a packet by packet basis managed at the application layer level on the host side, so that there is no need for allowing for the transport layer and other underlying layers. For the data resending by packets at the application layer level, the link information creation unit includes an application packet counter for counting every time receiving separated print data from the host to consequently obtain print data having the data length of an application layer packet on the host side, a page counter for counting the page count every time creating print data on a page by page basis through combination of the print data received, and a control memory for storing as link information the packet count of the application packet counter and the page count of the page counter. In this event, the resend request unit recognizes from the link information an application packet position on the host side corresponding to the foremost position of a print page at which the print error has occurred, to thereby issue a request to the host for resend of print data. The link information creation unit further includes an offset counter, e.g., a byte counter, for counting the offset indicative of a data position within an application packet on the host side. In cases where print data of a received application packet are separated into an endmost portion of the current page and a foremost portion of the next page, namely, where the print data extend over two adjacent paged, the link information creation unit saves link information on the page count of the current page and the packet count of the received application packet into the control memory, and further saves link information on the page count of the next page, the packet number of the same received application packet and the offset value of the offset counter into the control memory. The resend request unit, when a print error has occurred during the print out of a page having at its foremost position partial data of the received application packet, recognizes from the link information an application packet position corresponding to the page at which the error has occurred and a transfer start position within the packet, to thereby issue a request to the host for resend of print data.

In a further aspect of the printer according to the present invention, the link information creation unit, every time receiving print data from the host, creates and saves link information indicative of a correlation between a transfer data position on the host side and a print data position on the printer side. At that time, the link information creation unit, when a print error such as paper jam has occurred during the print out, recognizes from the link information a position from the head of host side transfer data corresponding to a print data position at which the print error has occurred, to issue a request to the host for resend of print data starting from the position recognized. In this manner, printer side retains correlation of print data relative to the host side on a data byte count basis managed by the application layer level, thereby achieving easy and rapid recovery due to resend request as a result of the occurrence of any print error. The link information creation unit includes a byte counter which, every time receiving print data from the host, counts the byte count from the foremost position of the print data; a page counter which counts the page count every time creating print data on a page by page basis through combination of the print data received; and a link information storage unit which stores as link information the byte count of the byte counter and the page count of the page counter. At that time, the resend request unit recognizes from the link information the byte count from the foremost position of the print data corresponding to the foremost position of a print page at which the print error has occurred, to thereby issue a request to the host for resend of print data. The link information creation unit creates and saves link information indicative of a correlation between a transfer data position on the host side and a line position on the printer side. When a print error such as paper jam has occurred during the print out, the link information creation unit may recognize a transfer data position on the host side corresponding to a line at which the print error has occurred, to thereby issue a request for resend. The printer of the present invention may employ either synchronous system in which control for printing out on the printer side is provided in synchronism with control for print data transfer from the host or asynchronous system such as TCP/IP in which control for printing out on the printer side is provided in asynchronism with control for print data transfer from the host.

According to the present invention, there is provided a method of controlling a printer apparatus serving to print out in sequence, on a desired print data length basis, print data transferred from a host associated by way of a network. This method comprises a link information creation step in which, every time receiving print data from the host, link information is created and saved which is indicative of a correlation between a transfer data position on the host side of the print data received and a print data position on the printer side; and a resend request step in which, when a print error such as paper jam has occurred during the print out, there is recognized from the link information a transfer data position on the host side corresponding to a print data position at which the print error has occurred, so that a resend request to the host is issued.

Furthermore, according to the present invention, there is provided a computer readable storage medium having a printer control program stored therein, the storage medium comprising a reception module for receiving print data transferred from a host associated by way of a network; a link information creation module which, every time receiving print data from the host, creates and saves link information indicative of a correlation between a transfer data position on the host side of the print data received and a print data position on the printer side; and a resend request module which, when a print error such as paper jam has occurred during the print out, recognizes from the link information a transfer data position on the host side corresponding to a print data position at which the print error has occurred, to thereby issue a resend request to the host.

The above and other objects, aspects, features and advantages of the present invention will become more apparent from the following detailed description with reference to the accompanying drawings.

BRIEF DESCRIPTION OF THE DRAWINGS

FIG. 8 is an explanatory diagram of correlations between the LAN packets and page configuration information of the printer, in accordance with the first embodiment of FIG. 7;

FIG. 9 is an explanatory diagram of link information created in the reception state of FIG. 8;

FIGS. 10A and 10B are explanatory diagrams of sequence upon the occurrence of print error, in accordance with the first embodiment of FIG. 7;

FIG. 19 is an explanatory diagram of link information created in the reception state of FIG. 17;

FIGS. 24A and 24B are explanatory diagrams of sequence upon the occurrence of a print error in the case where the synchronous communication is applied to the third embodiment of FIG. 20.

DETAILED DESCRIPTION OF THE PREFERRED EMBODIMENTS

System Configuration for Network Operable Printers

Figure 1:
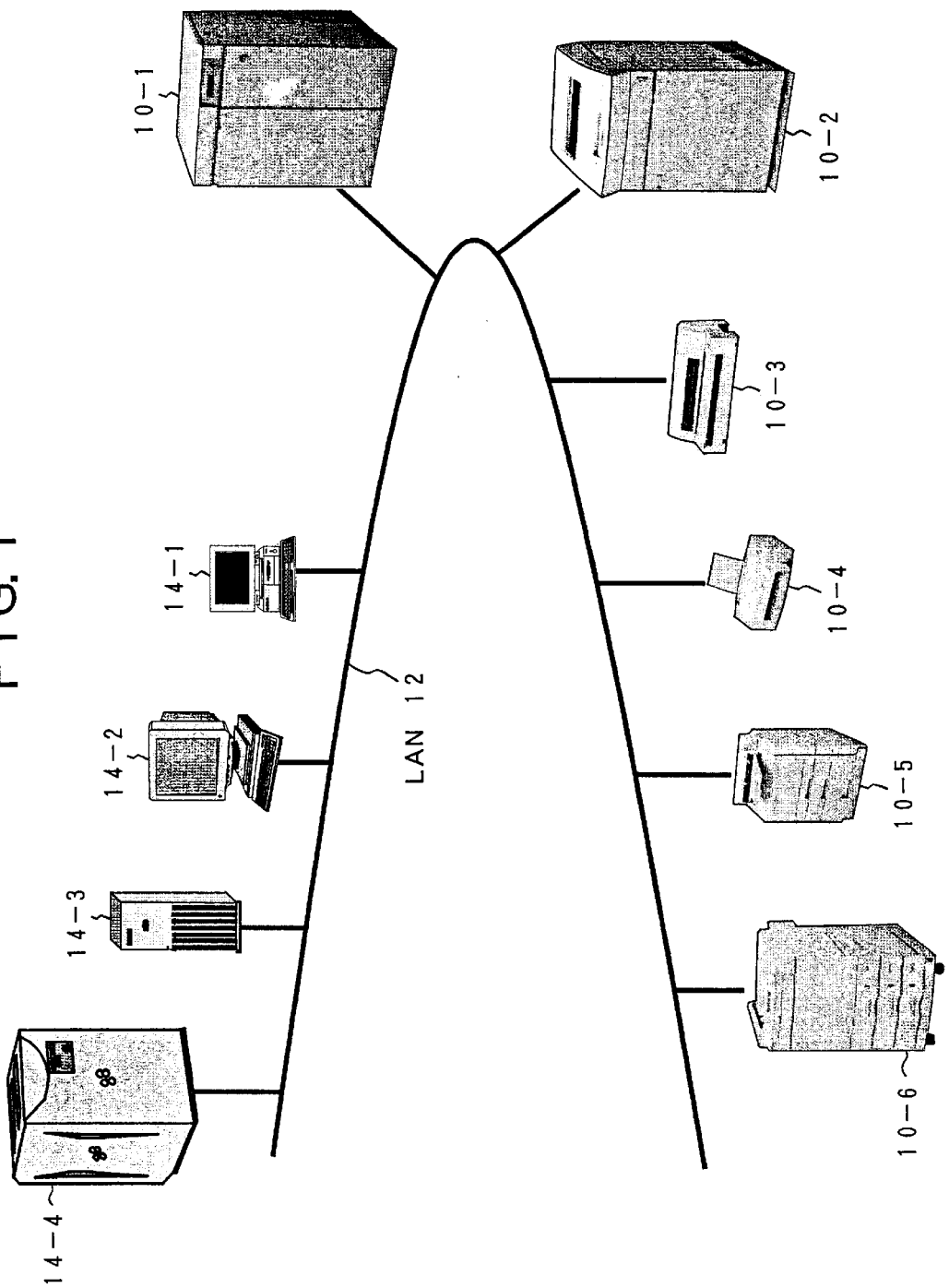
FIG. 1 is an explanatory diagram of a network to which is connected a printer in accordance with the present invention.

FIG. 1 is a configuration diagram of a system equipped with network adaptable printers of the present invention. Ethernet LAN for example represented by a LAN 12 is associated with network adaptable printing apparatuses of the present invention in the form of printers 10-1, 10-2, 10-3, 10-4, 10-5 and 10-6. These printers 10-1 to 10-6 are of different types by way of example, the printers 10-1 and 10-2 being high-speed printers equipped with a high-speed printing function, the printers 10-3 and 10-4 being low-speed or medium-speed printers for personal use, the printer 10-5 being a composite machine equipped with a facsimile function in addition to the printer function, and the printer 10-6 being a composite machine equipped with facsimile and optical character reader (OCR) functions in addition to the printer function. To the LAN 12 associated with such printers 10-1 to 10-6 there are connected a personal computer 14-1, servers 14-2 and 14-3, a mainframe 14-4, etc., which are on the host side. These hosts transfer print commands and print data to any designated one of the printers 10-1 to 10-6 so that the print data received printer composes print data on page-by-page basis for subsequent print output.

Figure 2:
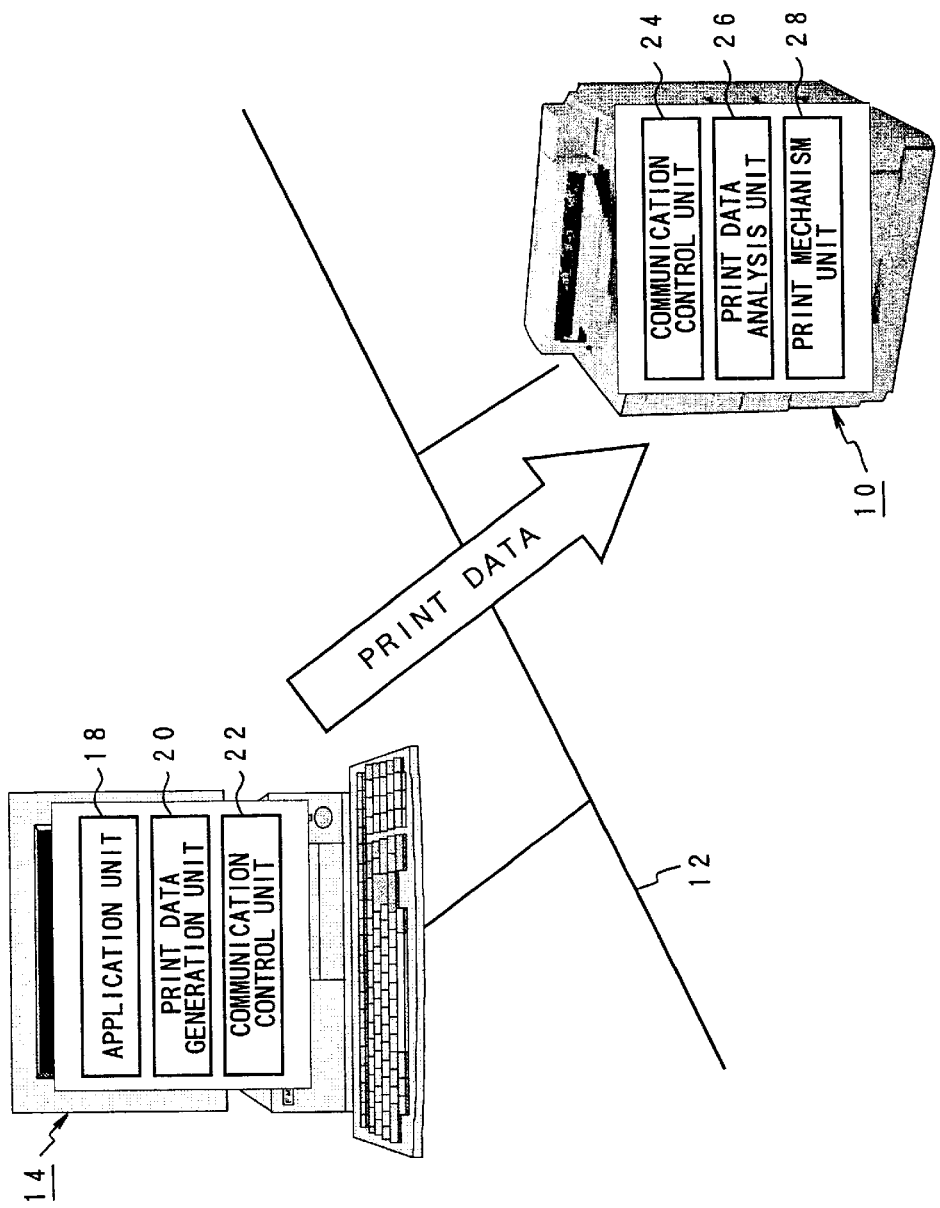
FIG. 2 is a block diagram of a function configuration of the printer and a host of the present invention.

FIG. 2 is a block diagram of a function configuration of the host and the printer in the present invention. The host 14 is constituted by an application unit 18, a print date generation unit 20 and a communication control unit 22. The application unit 18 is a part corresponding to an ordinary software for a word processor, spreadsheet, etc., in which data to be printed are created by the word processor function, the spreadsheet, etc. The print data generation unit 20 is a part corresponding typically to a printer driver, in which data from the application unit 18 are converted into a command system format interpretable by the printer 10. The communication control unit 22 is a part that provides a protocol control or the like for interchanging print data between the host 14 and the printer 10. The processing for printing operation in this host 14 is carried out following data flow starting from the application unit 18, through the print data generation unit 20, communication control unit 22, and via the LAN 12 to the printer 10. The printer 10 is constituted by a communication control unit 24, a print data analysis unit 26 and a print mechanism unit 28. The communication control unit 24 is a part that provides a protocol control for interchanging print data between the host 14 and the printer 10. The print data analysis unit 26 corresponds to an emulation unit that analyzes print data generated by and delivered from the host 14 on the basis of commands. The print mechanism unit 28 is a printer engine that actually prints the print data on paper. The ordinary printing actions in the printer 10 follow data flow starting from the host 14 through the communication control unit 24 and the print data analysis unit 26 to the print mechanism unit 28.

Figure 3:
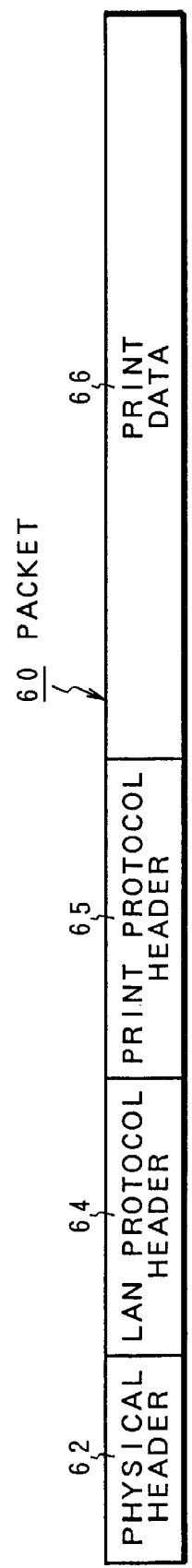
FIG. 3 is an explanatory diagram of a packet configuration on a LAN.

A packet containing print data transferred on the LAN 12 between the host 14 and the printer 10 of FIG. 2 has a configuration shown in FIG. 3. The packet 60 is constituted by a physical header 62, a LAN protocol header 64, a print protocol header 65 and print data 66. The physical header 62 is a domain for Ethernet addresses or the like of the LAN 12, and more specifically it is provided with an MAC address of a sender communication hardware and with an MAC address of a receiver communication hardware. The LAN protocol header 64 is a domain for use in data sending and reception on the LAN 12, and in case of a TCP/IP protocol header for example, it is provided with an IP address of a sender computer and an IP address of a receiver computer. It further includes IDs (port Nos.) of a sender software and IDs (port Nos.) of a receiver software, for specifying a communication software within the host and the printing apparatus. The print protocol header 65 is used to provide control information on printing operations and print data attributes, etc. The print data 66 are actual print data of a size equal to the remainder as a result of exclusion of the domains of the physical header 62, the LAN protocol header 64 and the print protocol header 65 from the maximum size of the packet 60. Now, in case of the packet 60 on Ethernet LAN by way of example, the maximum size of the packet 60 on the LAN is 1516 bytes. Assigned to the print data 66 is a byte count of the remaining domain as a result of exclusion of the domains of the physical header 62, the LAN protocol header 64 and the print protocol header 65.

Figure 4:
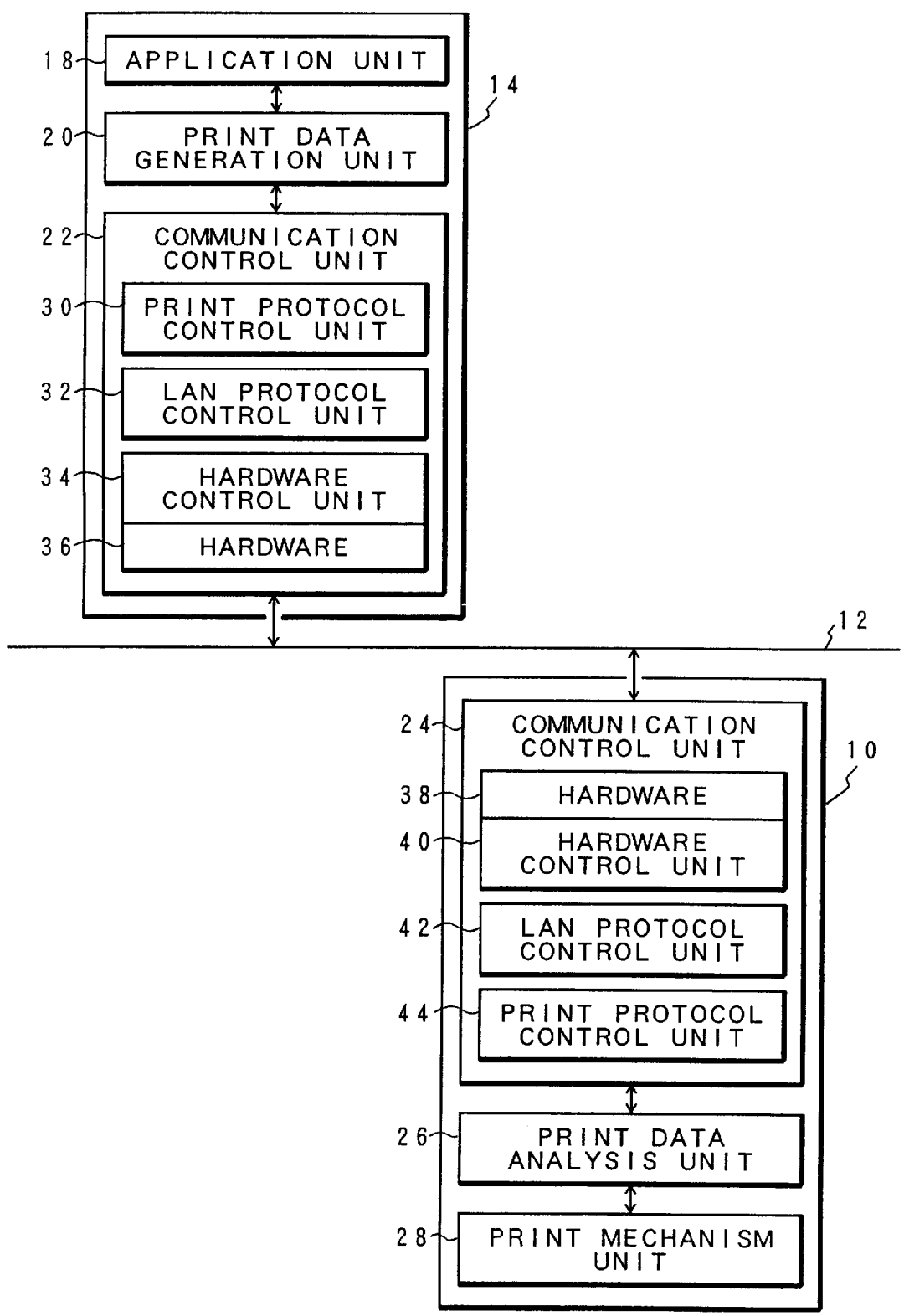
FIG. 4 is a block diagram of a detailed function configuration of communication control units of the printer and the host of FIG. 2.

FIG. 4 is a function block diagram showing the details of the communication control unit 22 of the host 14 and the communication control unit 24 of the printer 10 of FIG. 2. The communication control unit 22 of the host 14 comprises a print protocol control unit 30, a LAN protocol control unit 32, a hardware control unit 34 and a hardware 36. Similarly, the communication control unit 24 of the printer 10 comprises a hardware 38, a hardware control unit 40, a LAN protocol control unit 42 and a print protocol control unit 44. The hardware control units 34 and 40 make direct accesses to transmission line media such as LAN boards acting as the hardware 36 and 38, to actually send a packet onto the LAN 12 upon the reception of data from the LAN protocol control units 32 and 42, or to receive a packet from the LAN 12 to post the LAN protocol control units 32 and 42 on data. In practice, access is made to the physical header in the packet 60 on the LAN of FIG. 3. These hardware control units 34, 40 and hardware 36, 38 correspond respectively to a physical layer (1st layer) and a data link layer (2nd layer) in the seven layers of ISO. The LAN protocol control units 32 and 42 specifically correspond to processing units such as TCP/IP and are typically incorporated into an OS so as to act as a partial function of the OS. The LAN protocol control units 32 and 42 are intended to be used by an unspecified number of application layers and are not intended to be used only by the print protocol control units 30 and 44 corresponding to the application layers for print. For actual processing, access is made to the LAN protocol header 64 in the packet 60 on the LAN of FIG. 3. The protocol control units 32 and 42 correspond to a network layer (3rd layer) and a transport layer (4th layer) in the seven layers of the ISO. The print protocol control units 30 and 44 are parts for processing a protocol acting as an application layer defined for print use only and perform processing by accessing the print protocol header in the packet 60 on the LAN of FIG. 3. Herein, within the print protocol header 65 of a packet sent from the host 14 to the printer 10 there are designated commands for special control of the printer 10 as well as attribute information e.g., of whether the subsequent data are actual print data or not. For this reason, the print protocol control unit 44 associated with the printer 10 that has received the print protocol header 65 performs printing processing in accordance with the commands and information contained in the header. Also, within the print protocol header 65 from the printer 10 to the host 14 there are designated response information on the reception of print data as well as printer status information. For this reason, the print protocol control unit 30 of the host 14 that has received a print protocol header from the printer 10 performs, e.g., processing in which the status information such as normal reception response is judged to send next print data to the printer. It is natural that the packet from the printer 10 to the host 14 contain no print data. The print protocol control unit 44 of the printer 10 includes a control processing function for a resend request for error recovery of the present invention. That is, there occurs an error such as paper jam during the print of paper based on the print data transferred from the host 14, the print protocol control unit 44 issues a resend request with a designation of a packet to be transferred from the host 14 side, which is required for reprint of the page subjected to paper jam, on the basis of link information indicative of correlations between e.g., a packet of the host 14 side which has been created upon the reception of the packet and the page data on the printer 10 side.

Figure 5:
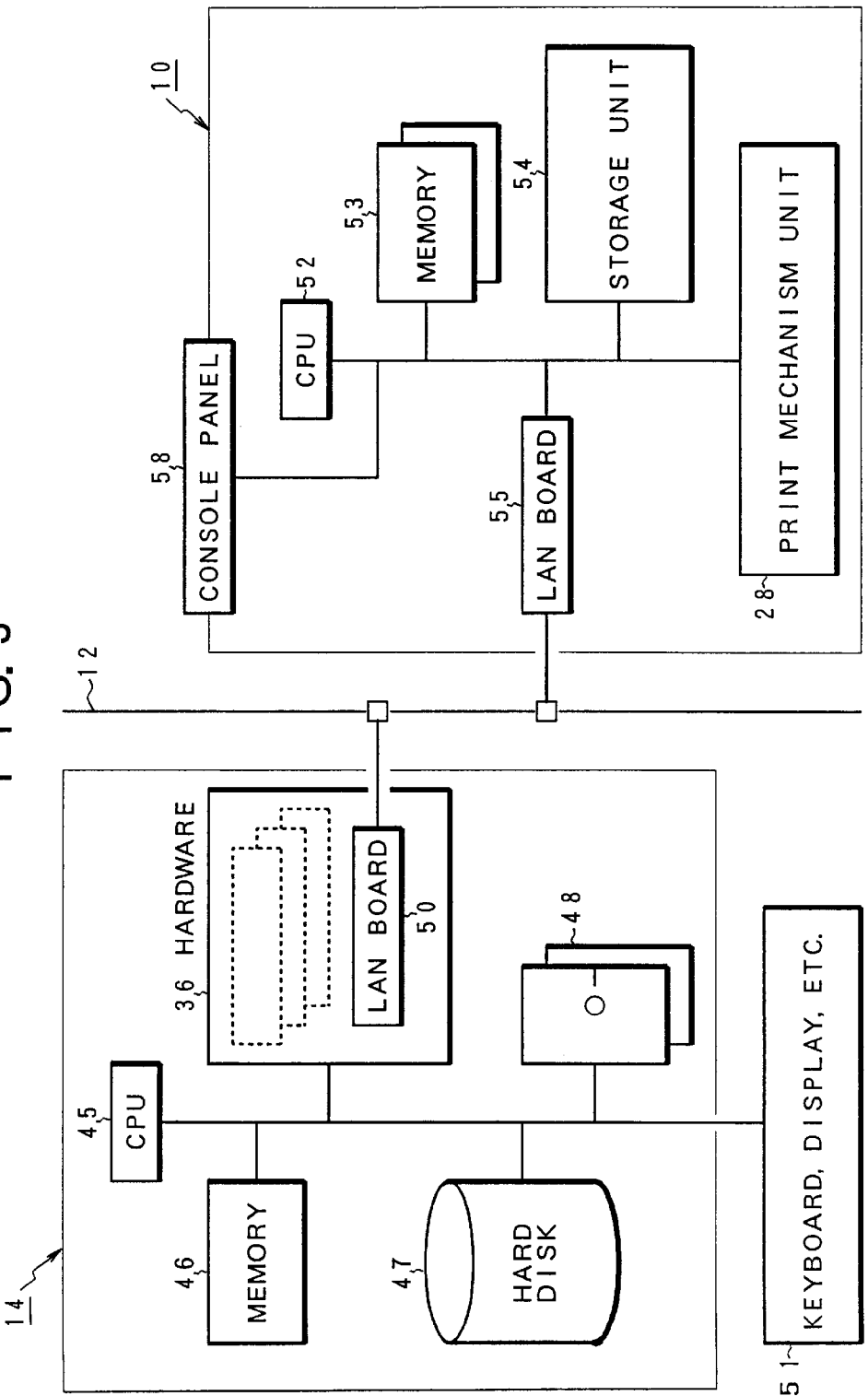
FIG. 5 is a block diagram of a hardware configuration of the printer and the host of the present invention.

FIG. 5 is a block diagram of a hardware configuration of the host 14 and the printer 10 of FIG. 4. The host 14 comprises a CPU 45, a memory 46, a hard disk drive 47, a CD, FD or other removable medium drive 48, a LAN board 50 provided as hardware 36, and an operation display unit 51 using a keyboard, a display, etc. On the other hand, the printer 10 comprises a CPU 52, a memory 53, a storage unit 54 for a ROM, a hard disk drive, etc., a LAN board 55 acting as hardware, a console panel 58 and a print mechanism unit 28. In the host 14, the hard disk drive 47 stores therein an OS and applications for performing various action processing, and further various hardware control programs (device drivers) and the like, all of which are deployed for action on the memory 46 upon the execution by the CPU 45. The network communication by way of the LAN 12 is carried out through the control of the LAN board 50 by the various programs. In the printer 10 on the other hand, a firmware (program) for printer action is stored in the storage unit 54 such as a ROM and a hard disk drive. Upon the action of the printer, the firmware in the storage unit 54 is deployed on the memory 53 so that the CPU 52 allows the firmware on the memory 53 to act. Naturally, the firmware may directly be run on the storage unit 54 such as the ROM without being deployed onto the memory 53. Furthermore, the memory 53 of the printer 10 can be used not only as the action area for the firmware but also as a bit map memory for deploying plotting data. The network communication of the printer 10 is carried out through the control of the LAN board 55 by the firmware.

Figure 14:
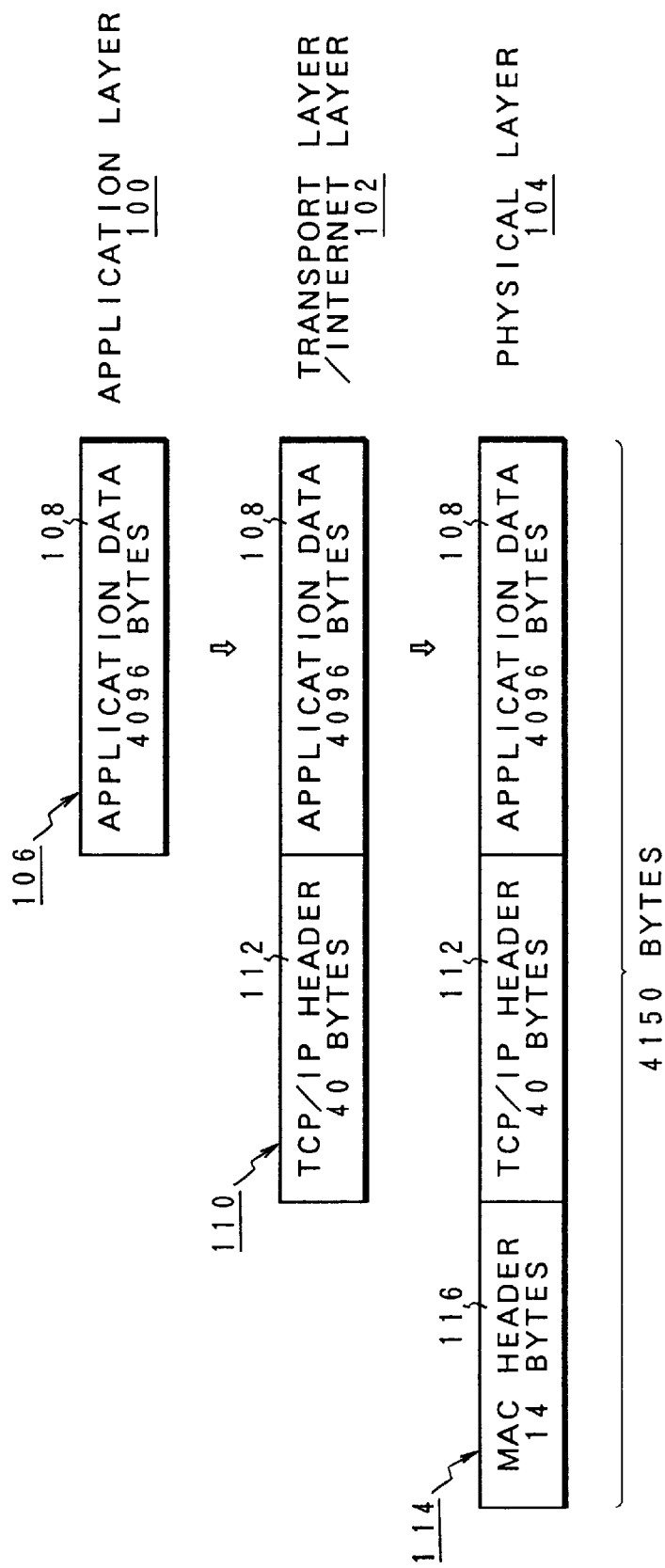
FIG. 14 is an explanatory diagram in which application layer level packet data are intactly converted by the host side into packets on the LAN.

The print protocol control unit 30 for performing recovery related processing for print error of the present invention provided in the host 14 of FIG. 14 is installed in the hard disk drive 47 from medium such as a floppy disk or a CD, and upon the actual actions, is deployed on the memory 46 in the same manner as the OS, applications and various hardware control units, after which it is executed by the CPU 45. The print protocol control unit 44 for implementing the recovery processing for print error provided in the printer 10 of FIG. 4 is previously stored, as a part of the firmware in the printer 10 of FIG. 5, in the storage unit 54 such as the ROM or hard disk drive, and upon the actual actions, it is deployed, as a part of the firmware, on the memory 53 and is executed by the CPU 52.

Figure 6A:
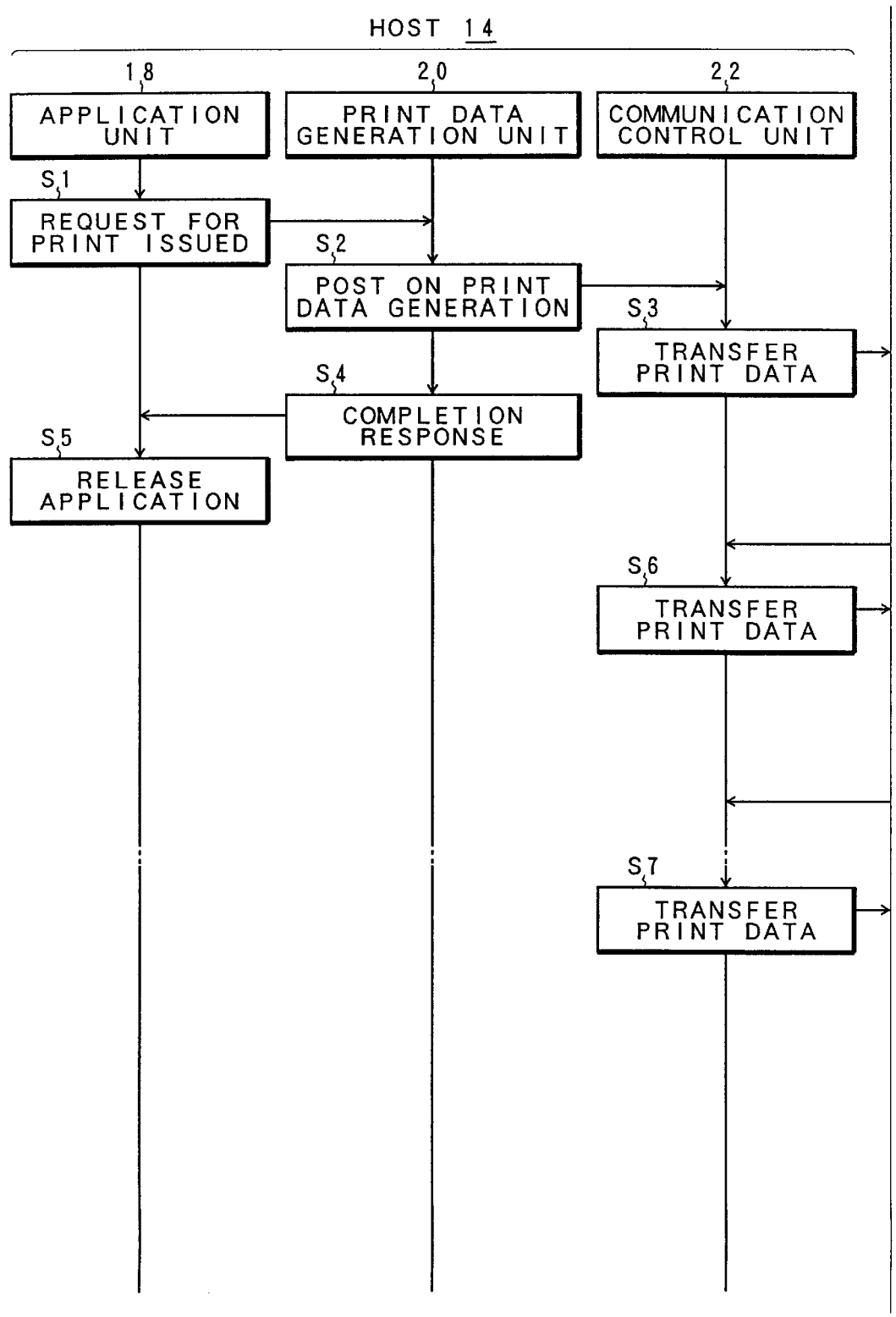
FIGS. 6A and 6B are explanatory diagrams of sequence upon normal actions of FIG. 4.
Figure 6B:
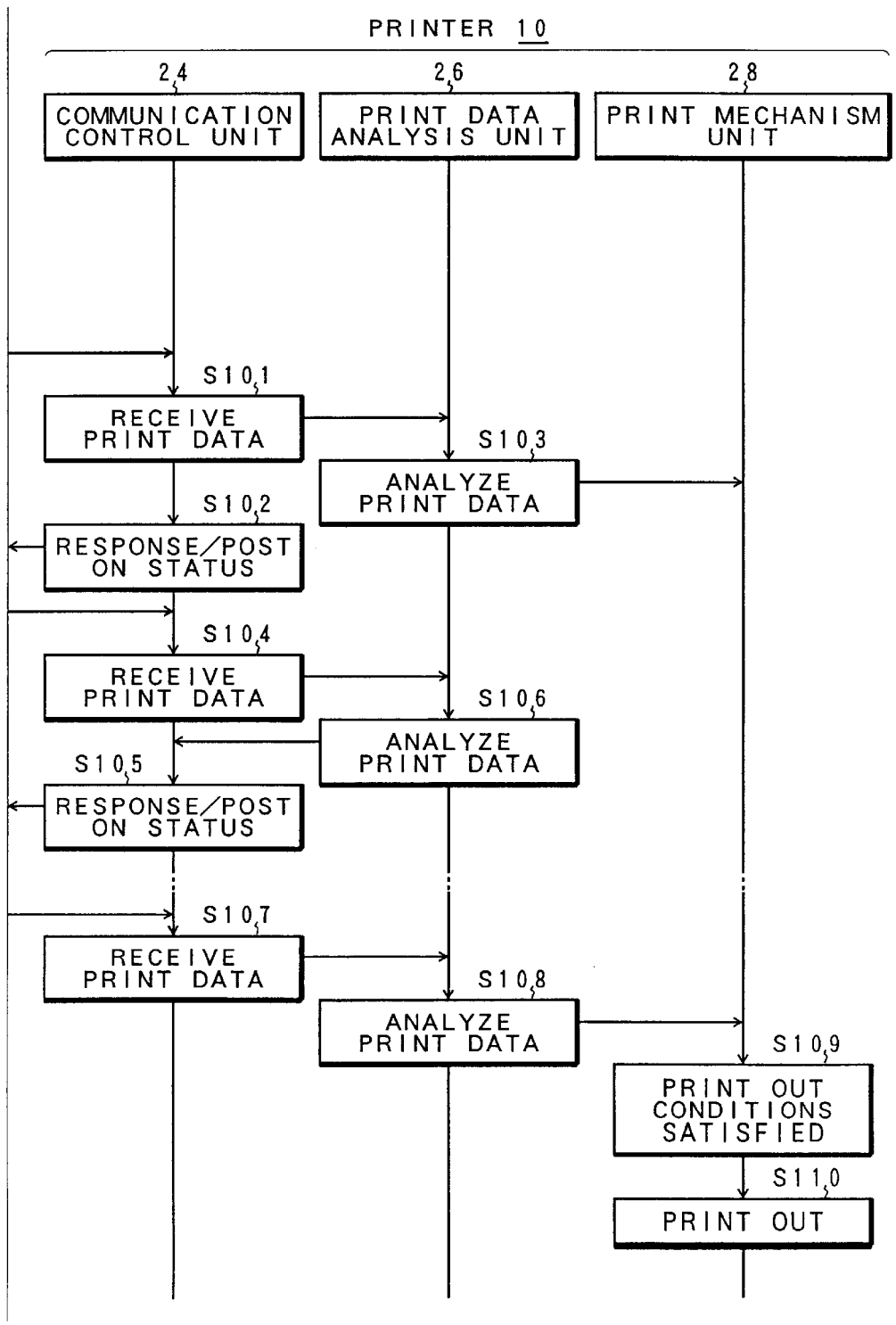

FIGS. 6A and 6B are explanatory diagrams of sequence of transfer processing of print data, which is carried out via the LAN 12 between the host 14 and the printer 10. First, if there occurs a request for print as shown in step S1 in the application unit 18 of the host 14, then the print data generation unit 20 in step S2 performs print data generation processing for converting data from the application unit 18 into print data of format interpretable by the printer 10 and posts the communication control unit 22 on this. After the completion of generation of all print data, the print data generation unit 20 in step S4 imparts a completion response to the application unit 18, with the result that in step S5 the application is released. The communication control unit 22 receives print data from the print data generation unit 20 and as in step S3, it sends the print data via the LAN 12 to the printer 10 side. The communication control unit 22 divides print data into application packets of 4096 bytes for example, and further divides into three for example the each 4096 byte application packet so as to be accommodated in 1514 bytes that is the maximum packet size of the Ethernet LAN. The unit 22 then transfers to the LAN 12 the packet 12 containing the thus trisected print data and added thereto the print protocol header 65, the LAN protocol header 64 and the physical header 62 as shown in FIG. 3. The communication control unit 24 of the printer 10 receives as in step S101 the packet containing the print data transferred from the host 14 onto the LAN, and in step S102 it makes the print data conform to a response to reception that has been normally received, and posts on the state of the printer 10 at that time. The print data that have been received in step S101 are analyzed by the print data analysis unit 26 in step S103 for the supply to the print mechanism unit 28. Subsequently, the packet transfer from the communication control unit 22 of the host 14 as well as reception analysis and response post by the communication control unit 24 and the print data analysis unit 26 of the printer 10 are repeated as shown in steps S6, S7 and steps S104 to S108 so that packet transfer of the print data is carried out from the host 14 to the printer 10. When paper print out conditions, e.g., print data for one page are completed through such plurality of print data transfers, the print mechanism unit 28 performs actual printing operation for the paper output as shown in step S110.

Error Recovery Based on LAN Packet and Page Link Information

Figure 7:
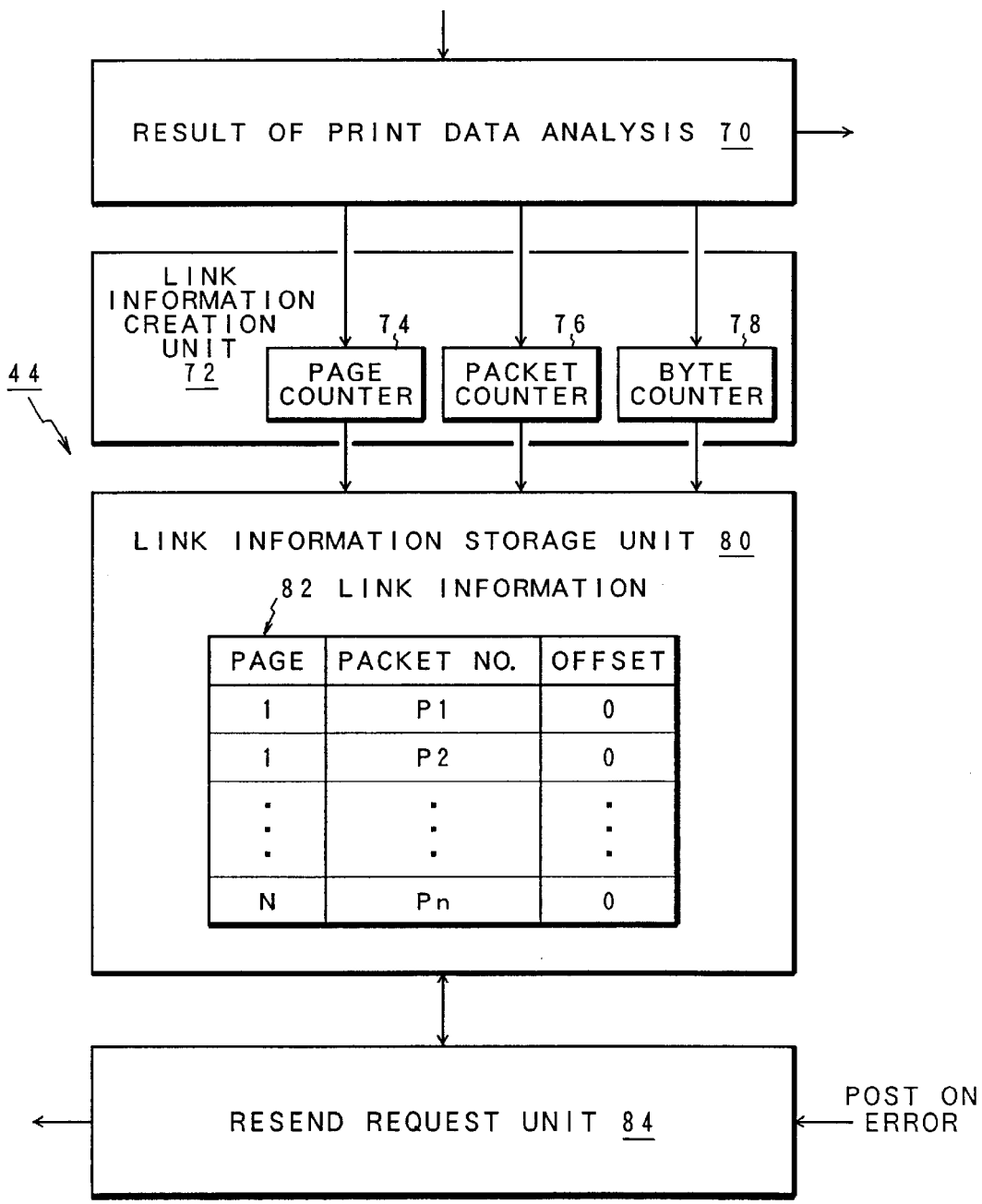
FIG. 7 is a block diagram of a first embodiment of the present invention in which link information on LAN packets and pages is created to issue a resend request for error recovery.

FIG. 7 is a block diagram of a first embodiment of the present invention for performing error recovery upon the occurrence of a print error on the basis of the LAN packet and page link information. This error recovery processing function is implemented as a partial function of the print protocol control unit 44 of the printer 10 shown in FIG. 4.

In FIG. 7, the print protocol control unit 44 comprises a link information creation unit 72, a link information storage unit 80 and a resend request unit 84. The link information creation unit 72 includes a page counter 74, a packet counter 76 and a byte counter 78. Upon the reception of a packet containing print data from the LAN, the link information creation unit 72 performs counting actions of the page counter 74, the packet counter 76 and the byte counter 78 on the basis of print data analysis result 70 acquired from the print data analysis unit 26. The page counter 74 performs an action counting the number of pages every time print data for one page are complete, from print data fetched from the received packet. The packet counter 76 performs an action counting the number of packets every time a packet containing print data is received from the LAN 12. In cases where a packet containing no print data has been received from the host side, this counting action of the counter 76 is carried out by no means. The byte counter 78 counts the number of bytes from the foremost position of the print data of the received packet. The page count, the packet count and the offset indicative of the byte count from the foremost position within the packet that are acquired by the page counter 74, the packet counter 76 and the byte counter 78 provided in the link information creation unit 72 are stored in the link information storage unit 80 as link information 82 on a packet by packet basis containing print data. That is, the link information 82 consists of three parameters including a page, a packet No., and an offset and it has therein registered correlations between the number of pages 1 to N in the printer 10 and the packet Nos. P1 to Pn of the packets from the host 14. Also, there is stored offsets, which are byte counts from the foremost positions of the print data transferred from the host. Note that the offset is normally zero as long as the print data of the received packet are not separated into two pages. When the resend request unit 84 receives a post on error such as paper jam requiring resending of print data during the print operation on a page by page basis, it refers to the link information 82 with the print page subjected to any error as an index, and recognizes the packet No. corresponding to the foremost print data on the error page requiring reprinting operation. The resend request unit 84 then imparts to the host 14 a resend request designating the foremost packet No. of this error page.

FIG. 8 represents correlations between the received packets on the print data LAN and the print page data in the first embodiment of FIG. 7. The print data 86 on the host side are provided from the application unit on the side of the host 14. When the packet is sent to the printer 10, the print data 86 are divided so as to be accommodated with its header in the maximum size defined for use on the LAN 12, e.g., the maximum size of 1514 bytes in the case of the Ether LAN. Thus, 1st packet print data, 2nd packet print data, . . . , n-th packet print data are obtained. Also, the last n-th packet print data 86 have the size less than the maximum size of the packet on LAN, but in this case the packet containing the n-th packet print data 86 is transferred with its vacancy. On the printer 10 side, print data on a page by page basis such as 1st page 90-1, 2nd page 90-2, etc., are composed from the combination of print data extracted from the received packets 88 as printer page data 90 by the communication control unit 24 and the print data analysis unit 26. Then the link information indicative of correlations between the received packets 88 and the printer page data 90 is created and preserved.

FIG. 9 shows the link information 82 created by the reception of print data of FIG. 8. In the link information 82 there are registered packet Nos. P1 to P11 of the corresponding received packets, i.e., that it is n-th packet from the foremost position, with respect to the foremost part of 1st page and 2nd page of the printer. For this reason, in cases where there has occurred an error such as paper jam during the printing operation in the printer 10 and where a resend request is issued to the host 14 for error recovery, the host 14 that has received the resend request has only to resend the print data from the requested packet simply and at high speed without being conscious of the page configuration in the printer 10, by referring to the link information 82 and by designating the foremost packet No. of the page to be reprented. For example, if a paper jam has occurred during the printing operation of 1st page 90-1 in the printer page data 90 of FIG. 8, reference is made to the link information 82 of FIG. 9 with the 1st page subjected to paper jam as an index, to thereby recognize the foremost packet No. P1 of the 1st page to issue a resend request designating the packet No. P1 to the host 14, whereupon transfer of the print data from the packet No. P1 is again carried out so that reprint from the 1st page 90-1 subjected to paper jam error can be made. By the way, in the printer page data 90 of FIG. 8, the last data of the 1st page 90-1 and the first data of the 2nd page 90-2 correspond respectively to the former half packet data PD10-1 and the latter half packet data PD10-2 of the 10th packet. In other words, the packet data PD10 of the 10th packet extends over the 1st page 90-1 and the 2nd page 90-2. In case an error such as paper jam has occurred during the printing operation of e.g., 2nd page 90-2 with one packet extending over two pages, it is only necessary to recognize the foremost packet No. P10 of the two pages subjected to any error from the link information 82 of FIG. 9 to issue a resend request to the host 14 side, and to perform reprocessing from the offset byte corresponding to the offset B10 from the foremost position within the packet, with respect to the print data fetched from the received packet P10 when the packet No. P10 has been received upon the resend request. Alternatively, it is also possible to post the host 14 on the offset B10 simultaneously with the foremost packet No. P10 of the two pages subjected to any error upon the resend request so that the host 14 side performs resending of the packet No. P10 allowing for the offset byte count, in other words, resending the packet P10 in which only the intra-packet data from the offset position are arranged.

Figure 10B:
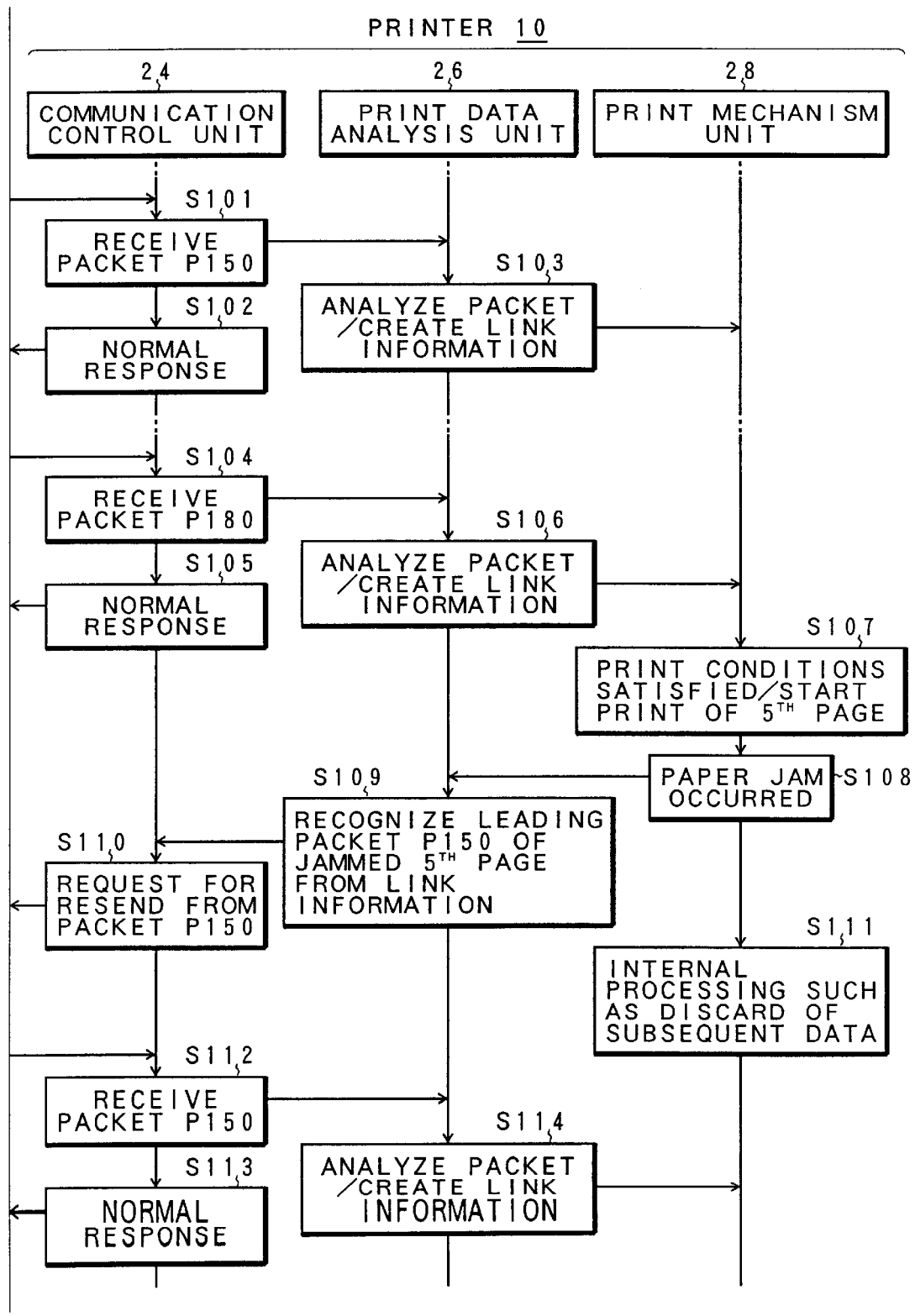

FIGS. 10A and 10B are explanatory diagrams of a resending sequence when paper jam has occurred during the printing operation of the 5th page whose page data are composed of packet Nos. P150 to P180 for example in the first embodiment of FIG. 7. The communication control unit 22 of the host 14 transfers in step S1 the packet P150 at the foremost position of 5th page and in step S2 the packet P180 at the last position of the 5th page. In correspondence to this, the printer 10 side as in steps S101 to S106 repeatedly performs the packet reception, normal response, packet analysis and link information creation as e.g., in steps S101, S102 and S103 showing the reception of the packet P150 for each reception of the packets P150 to P180. After the completion of the reception processing of the packet P180, the print conditions for completion of 5th page are satisfied in step S107 in the print mechanism unit 28 of the printer 10, to start the print of the 5th page. However, if there occurs a paper jam in step S108 during the print of the 5th page, the print data generation unit 26 is posted on paper jam error so that in step S109 the foremost packet P150 of the 5th page subjected to jam is recognized from the link information and that in step S110 a request for resend from the packet 150 is imparted to the host 14. In step S111, the print mechanism unit 28 performs internal processing such as arrangement of subsequent print data after 5th page subjected to paper jam as well as processing for removing the jammed paper. When the communication control unit 22 of the host 14 receives a resend request from the printer 10 in step S3, it starts the transfer of the packet P150 which has been requested in step S4 since this resend request includes a request for resend from the foremost packet P150 of the 5th page subjected to error. The transfer from the packet P150 and the action of the printer 10 side are the same as the steps S1, S2 and steps S101 to S106, so that when print conditions for completion of 5th page are satisfied in the print mechanism unit 28 of the printer 10, reprinting operation of the 5th page is carried out based on the resent print data.

Figure 11:
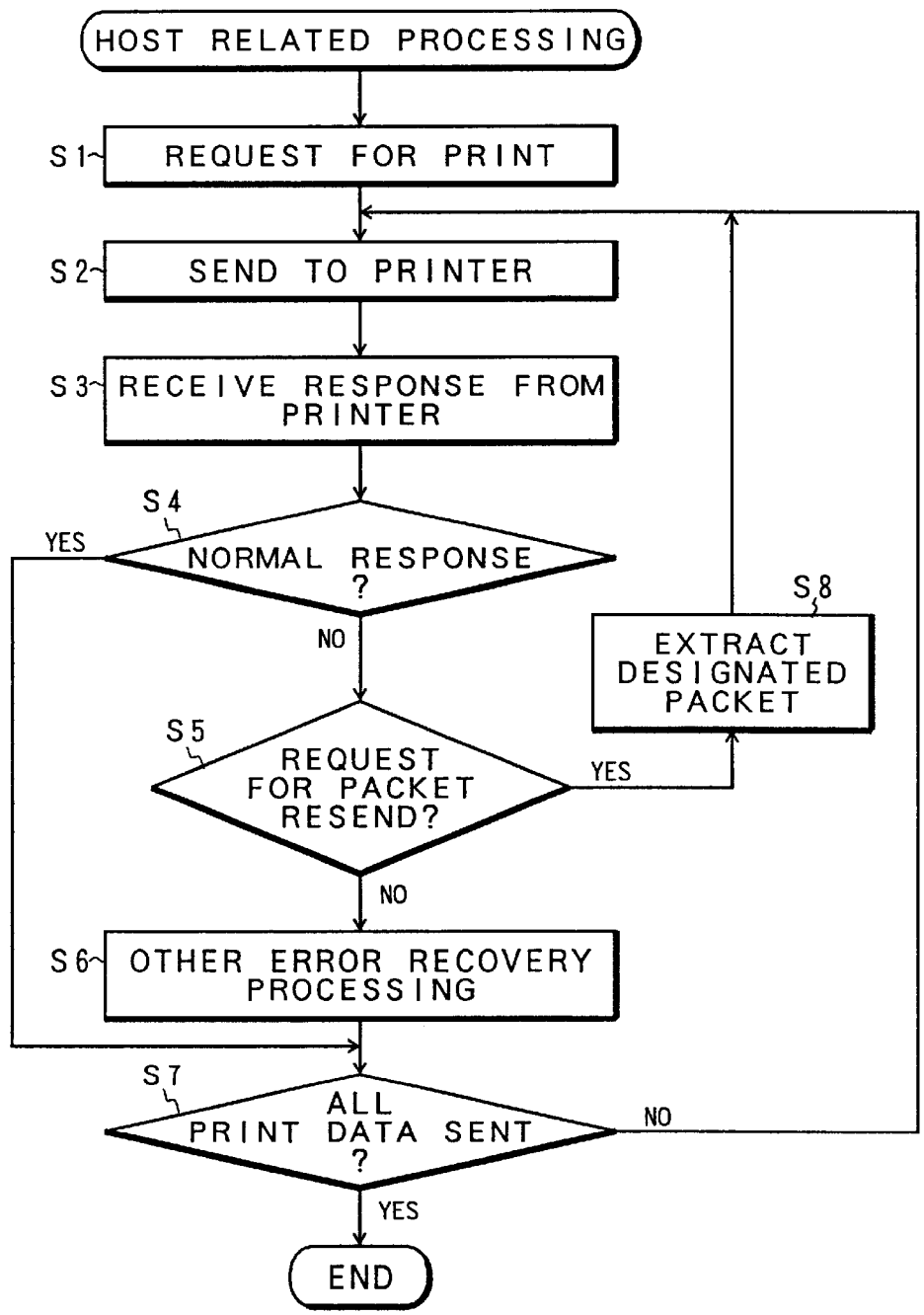
FIG. 11 is a flowchart of the host related processing corresponding to the first embodiment of FIG. 7.

FIG. 11 is a flowchart of the processing to be executed by the host 14 side equipped with processing functions corresponding to the error recovery in accordance with the first embodiment of FIG. 7. The host 14 first receives a request for print in step S1 and sends print data to the printer 10 by packet in step S2. After the completion of the sending of packet to the printer, it receives response and state post from the printer in step S3. If normal response is judged in step S4, the procedure advances to step S7. Until the completion of the sending of all print data, packet sending to the printer from the step S2 is repeated. If the response from the printer is other than the normal response in step S4, the procedure goes to step S5 in which check is made to see if it is a packet resend request or not. If it is the packet resend request, the procedure advances to step S8 in which a designated packet contained in the resend request is extracted, after which the packet is again sent to the printer 10 in step S2. If it is other than the packet resend request, the procedure goes to step S6 for performing other error recovery processing.

Figure 12:
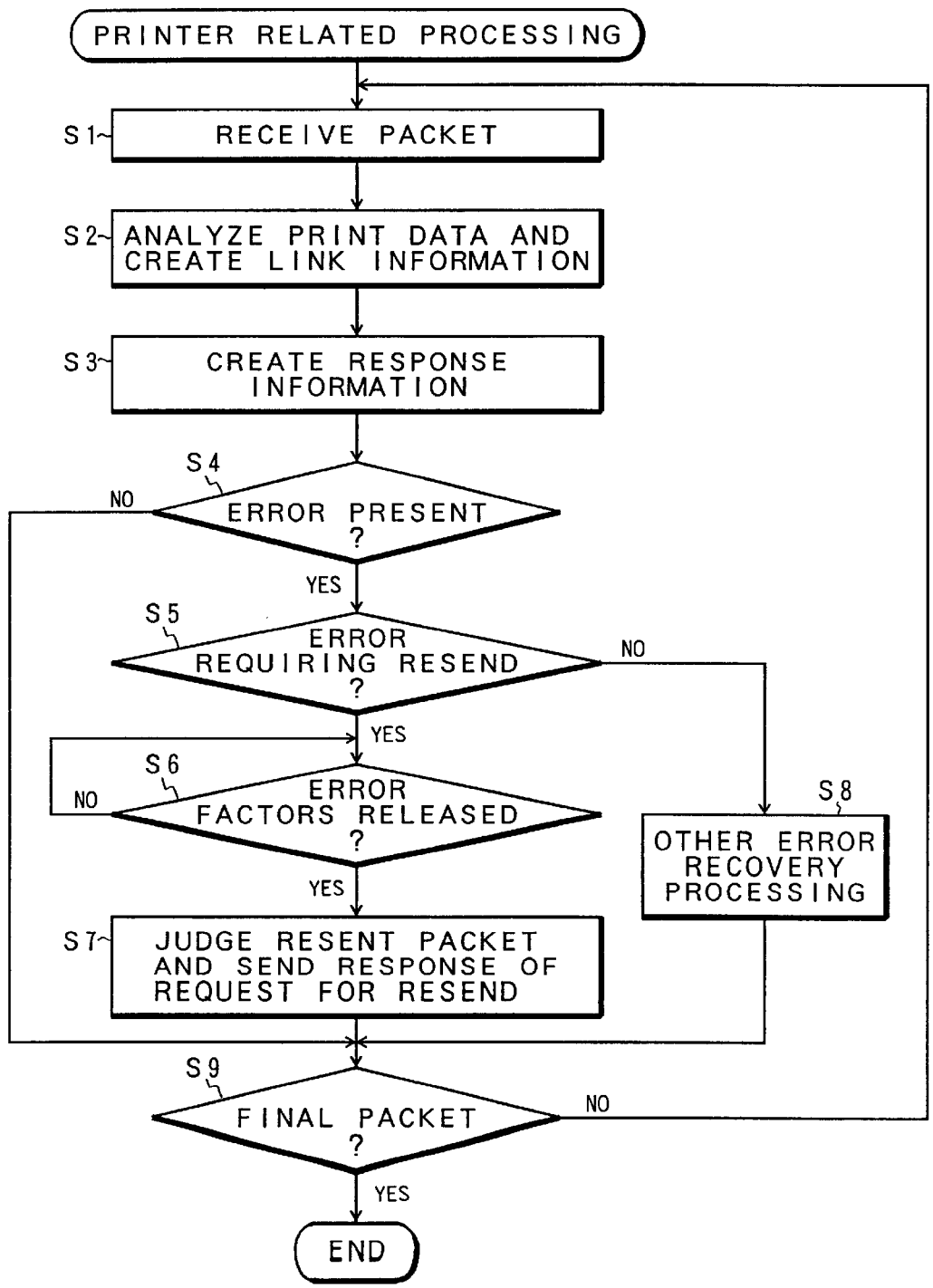
FIG. 12 is a flowchart of the printer related processing in the first embodiment of FIG. 7.

FIG. 12 is a flowchart of processing executed on the printer side, containing error recovery processing in accordance with of the first embodiment of FIG. 7. When the printer 10 receives a packet from the host in step S1, it performs print data analysis processing in step S2 and counts the number of received packets by means of the packet counter. On the basis of the packet counter as well as the page counter counting the pages, it creates and preserves link information in which received packet count is linked with the page count. Then in step S3, the printer 10 creates response information indicative of the packet normal reception and the state of the printer at that time and posts the host 14 on it. If any error has occurred upon the response to the host 14, the error on the printer side is judged in step S4 and check is made in step S5 to see if it is the error requiring a request for resend of print data. Providing that the error is an error such as paper jam requiring a resend of the print data, then the procedure goes to step S6 in which check is made to see if error factor release processing is complete or not which includes removal of the jammed paper and discard of internal data. If the error factor release is complete, then the procedure goes to step S7 in which reference is made to link information to judge the resent packet to return to the host a response of resend request with the resent packet designated. This allows a transfer of print data from the resent packet designated in the resend request from the host side. If the error is judged in step S5 to be an error requiring no resending, then the other error recovery processing is carried out in step S8. In this manner, by creating link information of correlations between the packets on the LAN of FIG. 7 and the pages on the printer side and by referring to the link information upon the occurrence of error such as paper jam requiring recovery including data resending and by imparting to the host a resend request with a designated foremost packet of the reprint page, the host has merely to perform packet transfer of print data immediately from the designated packet No. without being conscious of the page configuration on the printer 10 side upon the reception of the resend request, thereby achieving a simple and high-speed resending of the print data from the host, which is recovery processing upon the occurrence of errors such as paper jam.

Error Recovery Based on Link Information on Application Packets and Pages

Figure 13:
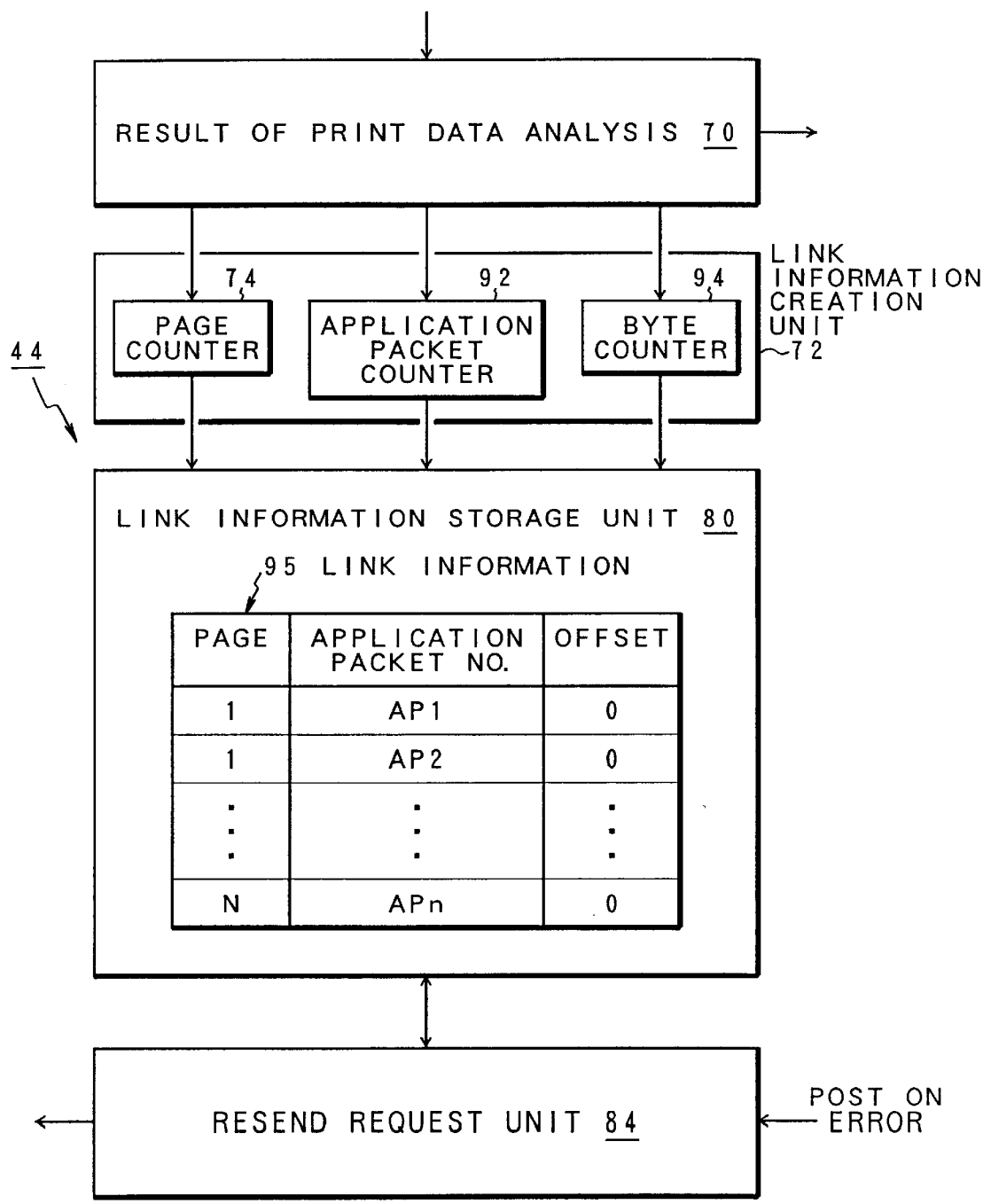
FIG. 13 is a block diagram of a second embodiment of the present invention in which link information on application layer level packets and pages is created to issue a resend request for error recovery.

FIG. 13 is a function block diagram of a second embodiment of the present invention implementing error recovery processing, provided as a function of the print protocol control unit 44 of the printer 10 of FIG. 4. The print protocol control unit 44 for the error recovery of this second embodiment comprises the link information creation unit 72, the link information storage unit 80 and the resend request unit 84. Without using the correlations between the packets on the LAN and the pages, the link information creation unit includes an application packet counter 92 for counting the print data of the packet size at the application layer level created by the print protocol control unit 30 of the communication control unit 22 in the host 14 of FIG. 4, and a byte counter 94 indicative of the byte count within the packet when this application packet extends over two pages. For this reason, the link information storage unit 80 stores as link information 95 the page Nos. 1 to N counted by the page counter 74, the application packet Nos. AP1 to APn counted by the application packet counter 92, and the offsets counted by the byte counter 94.

Now, when print data are sent from the application layer, if the size of the application layer sending data exceeds 1514 bytes which is the maximum size of the Ethernet LAN, the print data are divided by the processing of the transport layer or under of the host 10 side, so that a packet of the maximum size equal to or less than 1514 bytes inclusive of the header is sent onto the LAN. On the contrary, the data reception on the printer 10 side is achieved by the processing by the transport layer or under on the printer side which is the reception side so that the application layer of the printer 10 can receive intactly data in data size received by the application layer of the sender host 14. For this reason, as the link information of FIG. 13 the printer side 10 can judge the correlations by the page Nos. and the application packet Nos. provided as data size at the application layer level. The correlations between this application layer and each packet on the LAN is more specifically described as follows.

FIG. 14 shows the case where the application layer 100 issues application data 108 of 4096 bytes in the form of an application packet 106. If this 4906-byte application data 108 from the application layer 100 are sent intactly in the form of a packet onto the LAN corresponding to the physical layer 104, the packet on the LAN will result in 4150 bytes in total by the addition of 40 bytes of the TCP/IP header 112 and the addition of 14 bytes of the MAC header 116 in the physical layer 104, which exceeds the maximum 1514 bytes of the Ethernet LAN, making it impossible to send it.

Figure 15:
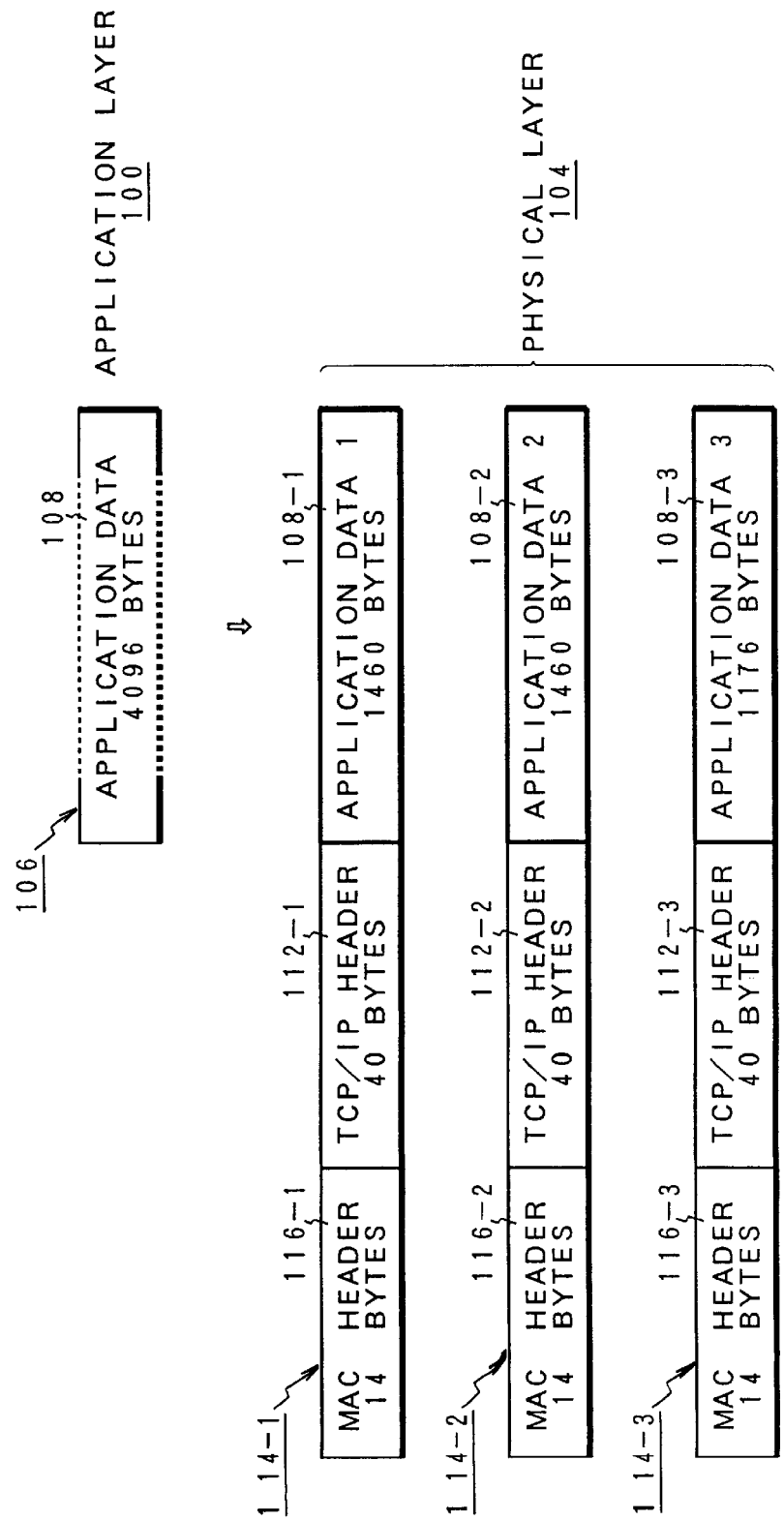
FIG. 15 is an explanatory diagram in which the application layer level packet data are divided by the host side into three packets on the LAN.
Figure 16:
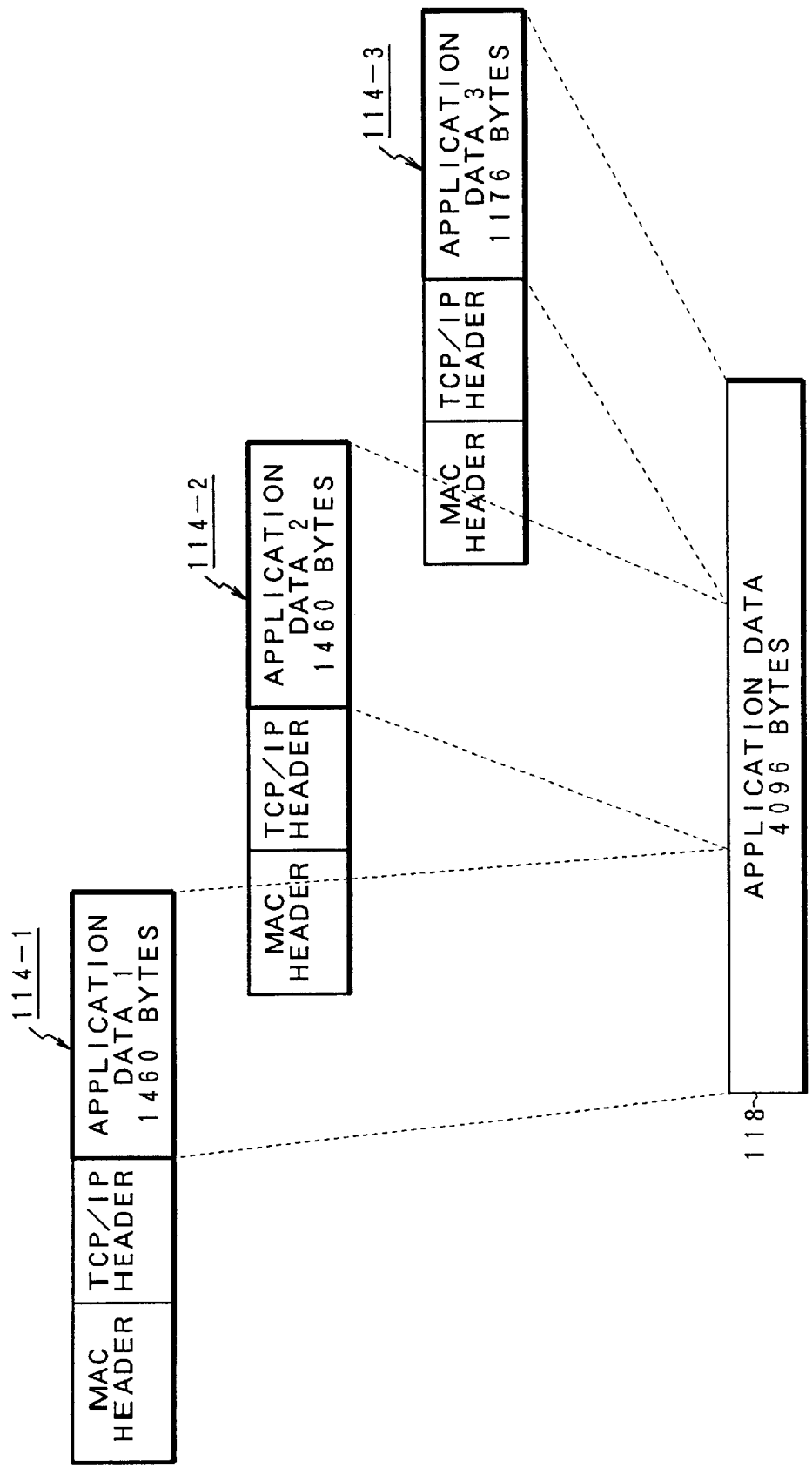
FIG. 16 is an explanatory diagram in which the printer side receives the three packets of FIG. 15 to build an application layer level packet.
Figure 17:
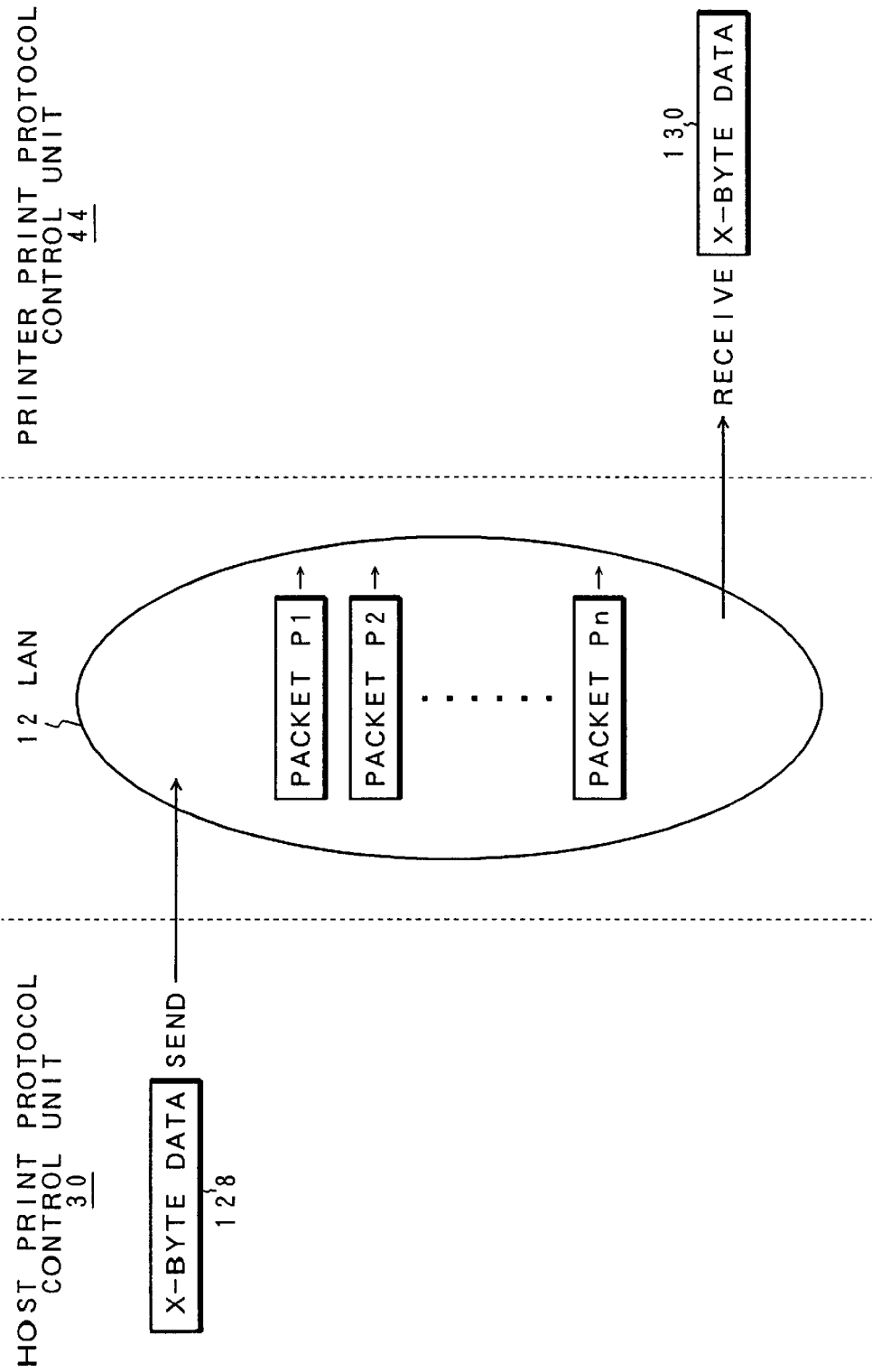
FIG. 17 is an explanatory diagram in which the application layer level packet of FIG. 16 is data sent and received by print protocol control units of the host and the printer.

Thus, as shown in FIG. 15, the 4096-byte application data 108 are trisected into 1460 bytes, 1460 bytes and 1176 bytes, which are sent onto the LAN as packets 114-1 to 114-3, respectively, with the addition of TCP/IP headers 112-1 to 112-3 and MAC headers 116-1 to 116-3, respectively. The printer 10 side receives as shown in FIG. 16 the three packets 114-1 to 114-3 sent onto the LAN in a manner of FIG. 15 to build the divided application data 108-1 to 108-3 into 4096-byte application data 118 which is the same as the application layer 100 of FIG. 14. For this reason, as shown in FIG. 17, even though X-byte data 128 at the application layer level have been divided into a plurality of packets P1 to Pn on the LAN, the print protocol control unit 30 of the host and the protocol control unit 44 of the printer can receive the X-byte data 128 and 130 at the application level in the form of one packet, so-called an application packet by the acquisition of X-byte data 130 combined after sending. Thus, it is possible for the second embodiment to create the link information indicative of correlations with the page configuration in the printer on a packet by packet basis managed at the application layer level, that is, on an application packet basis, in place of the LAN level packet of the first embodiment of FIG. 7, and to perform a resend request with the designated packet position at the application level, as the resend request for error recovery upon the occurrence of errors on the printer side.

Figure 18:
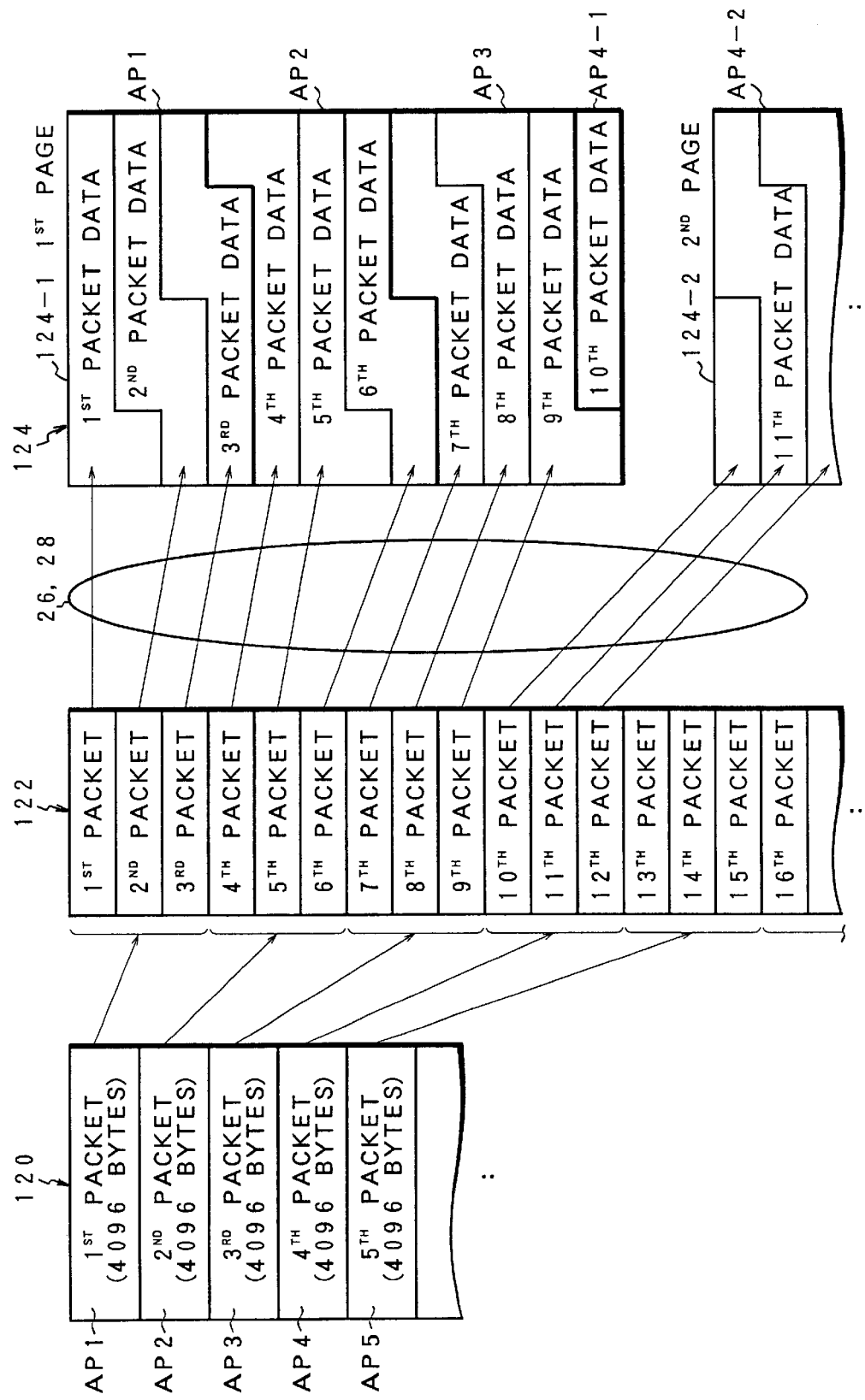
FIG. 18 is an explanatory diagram of correlations between application packets and page configuration information of the printer, in accordance with the second embodiment of FIG. 13.

FIG. 18 shows the correlations of print data for error recovery on packet by packet basis managed at application layer level of FIG. 13. The print data 120 at the application layer level on the host side are divided into application packets AP1, AP2, AP3, etc., in 4096 byte unit for example, with each application unit being trisected on the LAN to be received by the printer 10 side as the received packet 122. From this received packet 122, printer page data 124 are generated by the processing of the printer associated communication control unit 26 and print data analysis unit 28. The printer page data 124 correspond to application packets AP1, AP2, AP3 and AP4 in three-packet unit. The fourth application packet AP4 extends over the 1st page 124-1 and the 2nd page 124-2.

FIG. 19 shows link information 95 in the case of managing the packet at the application layer level of FIG. 18, in which 1st page stores therein the application packet Nos. AP1 to AP4, with 2nd page beginning at the application packet No. AP4. In the case of the application packet AP4 extending over the 1st page 124-1 and the 2nd page 124-2, there is stored an offset byte count B4 indicative of data foremost position within the application packet, correspondingly to the 2nd page application packet No. AP4. Also in the case of creating the link information managing the correlations with the pages on the printer side on the packet by packet basis at the application layer level in this manner, if there occurred paper jam during the printing of the 1st page 124-1 of FIG. 18 for example, reference is made to the link information 95 of FIG. 19 with the 1st page subjected to paper jam as the index, to thereby recognize the foremost application packet No. AP1 to issue a resend request with designated application No. AP1 to the host 14 side, thus performing a resend, from the foremost application packet No. AP1, of the print data on the host 14 side for achieving the error recovery.

In case there has occurred paper jam during the printing of 2nd page 124-2 of FIG. 18, reference is made to the link information 95 of FIG. 19 with the 2nd page subjected to paper jam as index to thereby recognize the foremost application packet No. AP4 and to simultaneously recognize the fact starting from the mid-part of the application packet No. AP4 from the offset byte count B4. In this case as well, a resend request with designated application packet No. AP4 is imparted to the host 14 such that print data are retransferred from the application packet AP4. In this event, the page data are configured for reprinting in such a manner that with respect to the firstly received application packet AP4, the foremost data of the 2nd page 124-2 are located at a position offset by the offset byte B4 acquired from the link information 95. Alternatively, upon the resend request, the host 14 may be posted on the offset byte count B4 in addition to the application packet No. AP4 so that print data from the offset byte B4 are resent as data of application packet AP4. In this manner, by creating the link information on correlations with the number of pages on the printer side on a packet by packet basis managed at the application layer level, and by issuing a resend request with a designated application packet upon the occurrence of error such as paper jam, it is possible for the host 14 side to perform resending of print data for error recovery for printer side simply and at a high speed, without taking into consideration the transport and other layers underlying the application layer. As used herein, the application layer means an upper layer on top of the transport layer in the seven layers of the O SI. In the case of TCP/IP, this means an upper layer on top of the TCP layer, and more specifically a layer on the same level as the Telnet header, ftp header, etc.

Error Recovery Based on Link Information on Data Byte Count and Pages

Figure 20:
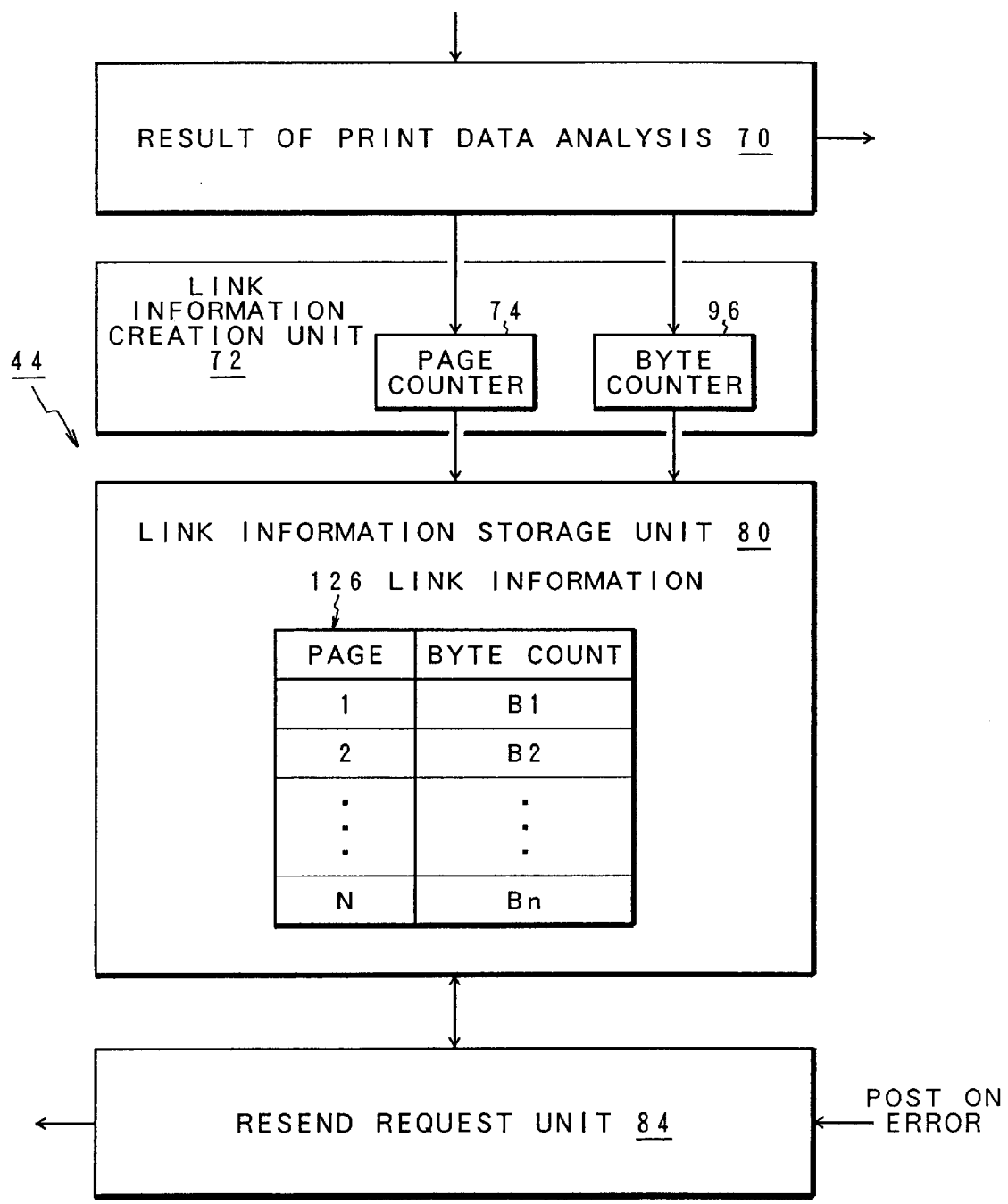
FIG. 20 is a block diagram of a third embodiment of the present invention in which link information on application layer level byte count and pages is created to issue a resend request for error recovery.

FIG. 20 is a function block diagram of a third embodiment of the present invention, implemented by the print protocol control unit 44 on the printer 10 side for error recovery, which issues a request for resend of print data upon the occurrence of errors such as paper jam. The third embodiment for error recovery comprises the link information creation unit 72, the link information storage unit 80 and the resend request unit 84. The link information creation unit 72 is provided with the page counter for counting the number of pages every time page data for one page are formed on the basis of the received packet, and with the byte counter 96 for counting the byte count from the foremost position of the print data. That is, this third embodiment uses the data byte count from the foremost position of print data as the managing unit of the print data at the application layer level, and it creates link information 126 on correlations between the data byte count from the foremost position of these print data and the page count the printer side, to store it within the link information storage unit 80.

Figure 21:
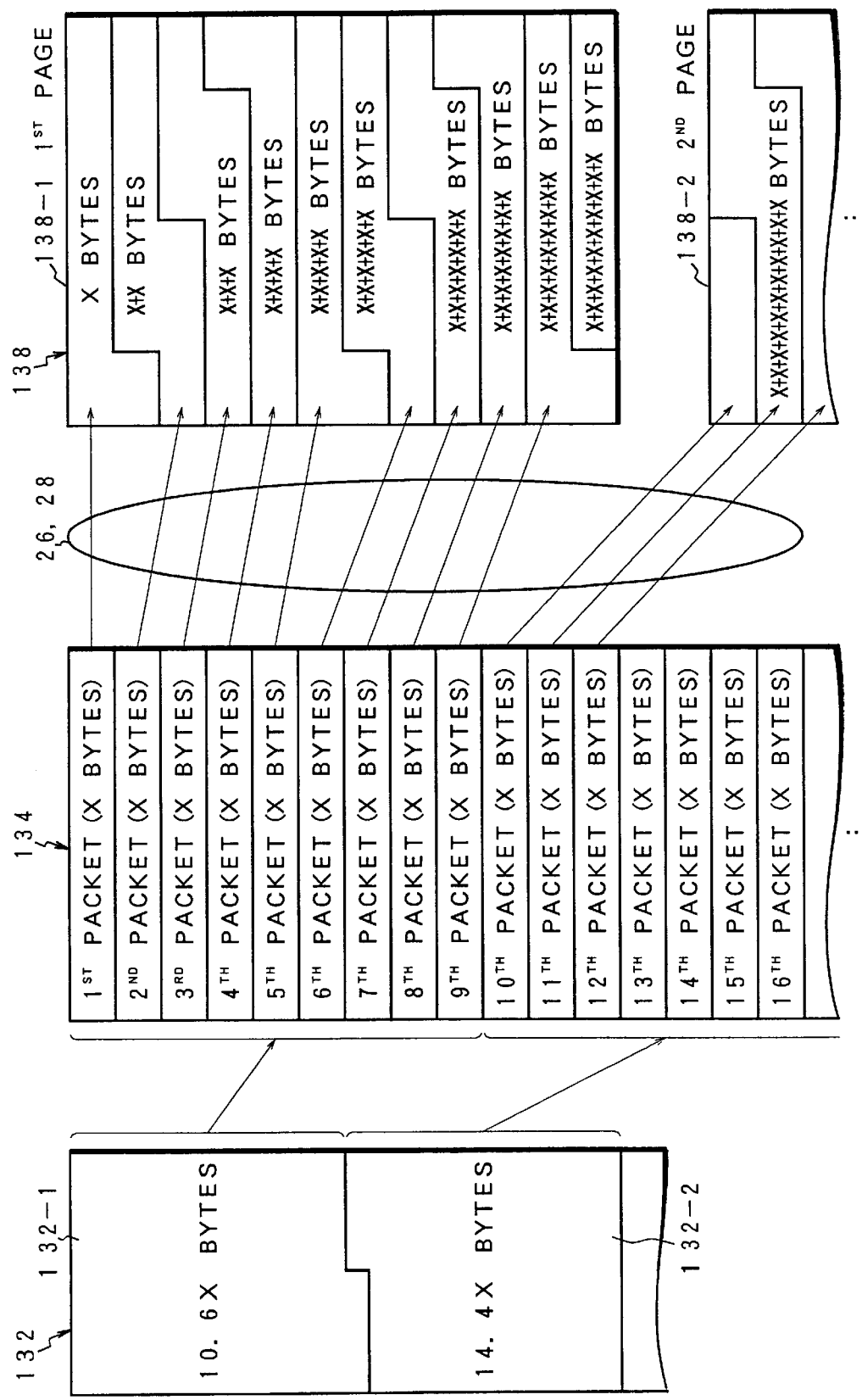
FIG. 21 is an explanatory diagram of correlations between the print data and the page configuration information of the printer, in accordance the third embodiment of FIG. 20.
Figure 22:
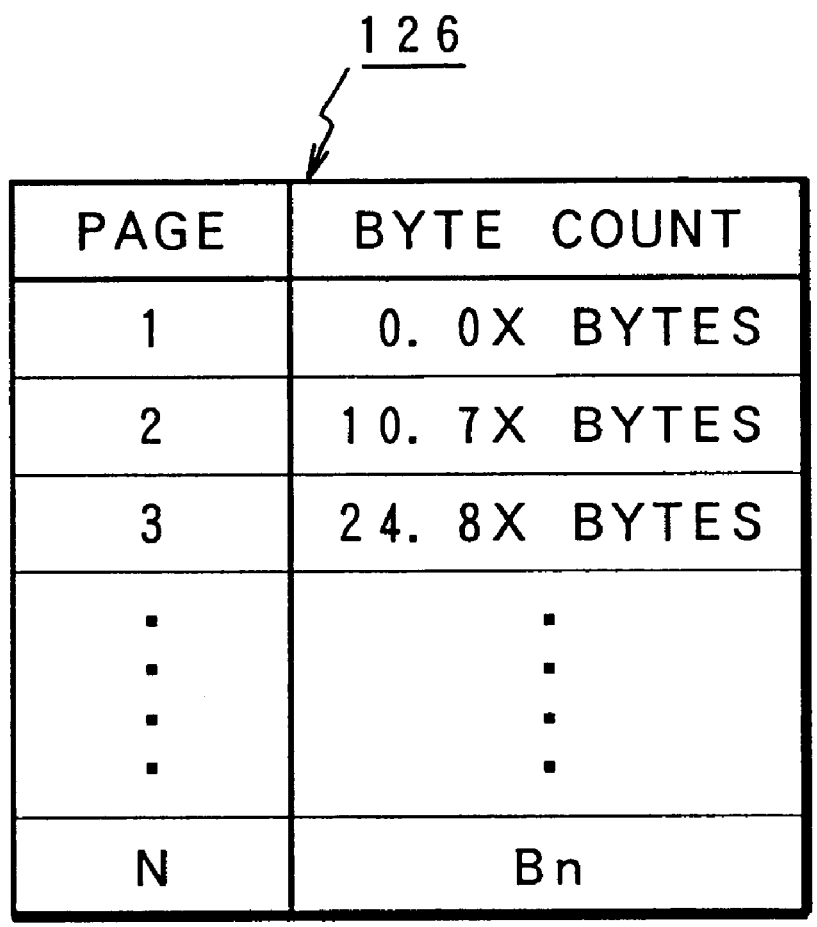
FIG. 22 is an explanatory diagram of link information created in the reception state of FIG. 21.

FIG. 21 shows correlations between the print data and the printer page data for issuing a resend request for error recovery on a data byte basis managed at the application layer level of FIG. 20. Print data 132 managed at the application layer level on the host side are issued as a packet on the LAN 12 and are received as a received packet 134 by the printer side. Printer page data 138 are received by the communication control unit 26 and the print data analysis unit 28 of the printer 10. Assume herein that the print data sizes in the received packet 134 are X bytes, with the 10th packet extending over the 1st page 138-1 and the 2nd page 138-2, with the 1stand 2nd pages being respectively 0.6 X bytes and 0.4 X bytes for example. In this case, the 1st page 138-1 is 10.6 X bytes and therefore the starting byte of the 2nd page 138-2 is 10.7 bytes. That is, the byte counter 96 of FIG. 20 starts the byte count of the received data from the foremost position of the print data, namely, from the 1st packet of the received packet 134, and stores the byte count, 10.7 X bytes, of the foremost byte of the next 2nd page 138-2 in the link information 126 after the completion of the 1st page 138-1. Thus, the link information 126 preserves the byte count from the foremost position of the print data indicative of the foremost position of each page. For this reason, in case there has occurred an error of paper jam at any arbitrary page during the printing operation, the link information 126 of FIG. 22 is referred to with the page subjected to the error as the index. Then a corresponding byte count value is read and a resend request with this byte count value designated is imparted to the host 14 side, whereby for resending, a received packet is created from the print data located at a position offset by the data byte count designated by the resend request from the foremost position in the print data 132 at the application layer level. In this case as well, the host side can recognize the data byte count from the foremost position of the print data by the resend request, so that it can perform simply and rapidly resending of the print data in response to the resend request for the error recovery without being conscious of the underlying transport and other layers.

Figure 23A:
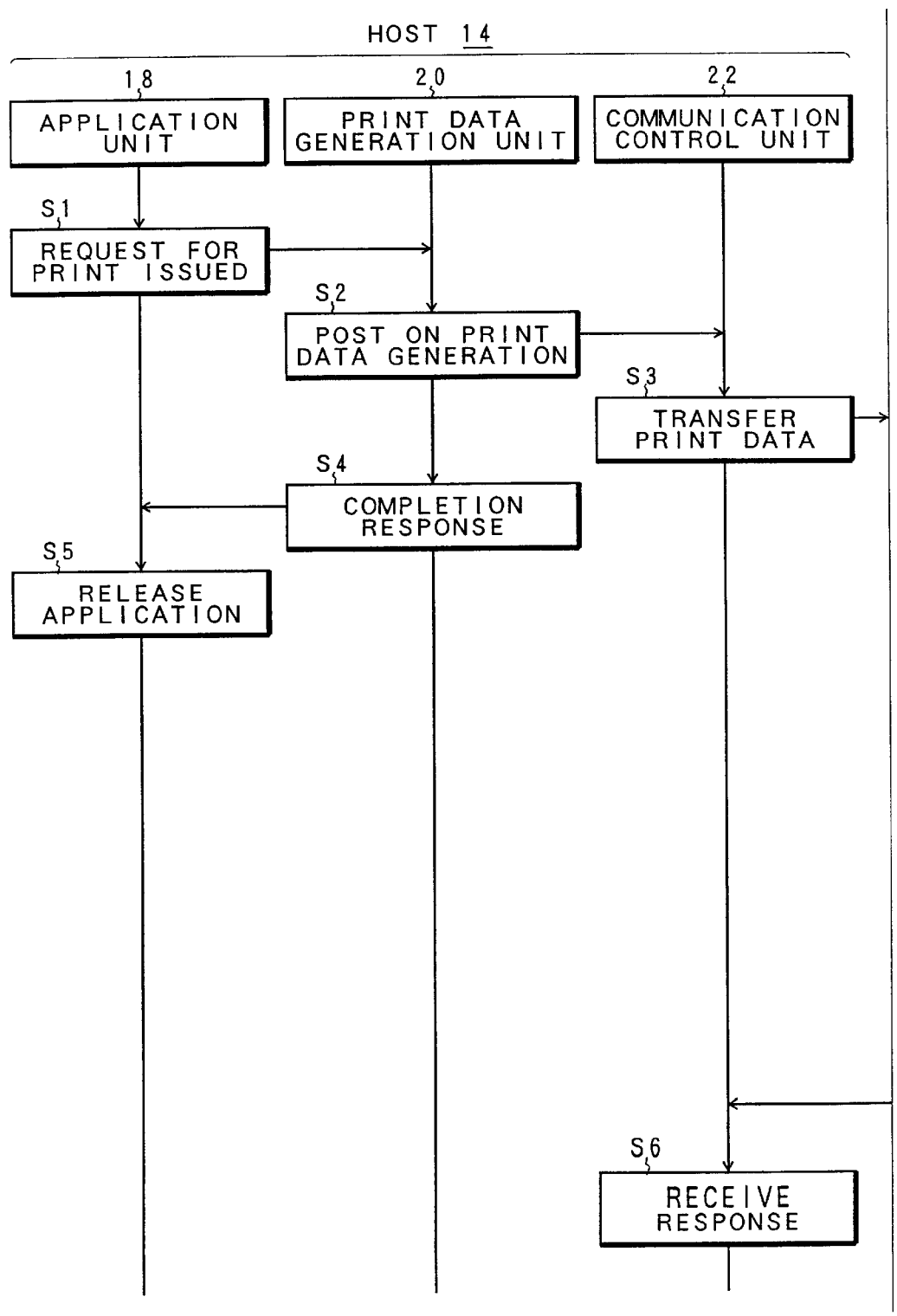
FIGS. 23A and 23B are explanatory diagrams of sequence upon normal time in the case where synchronous communication is applied to the third embodiment of FIG. 20.
Figure 23B:
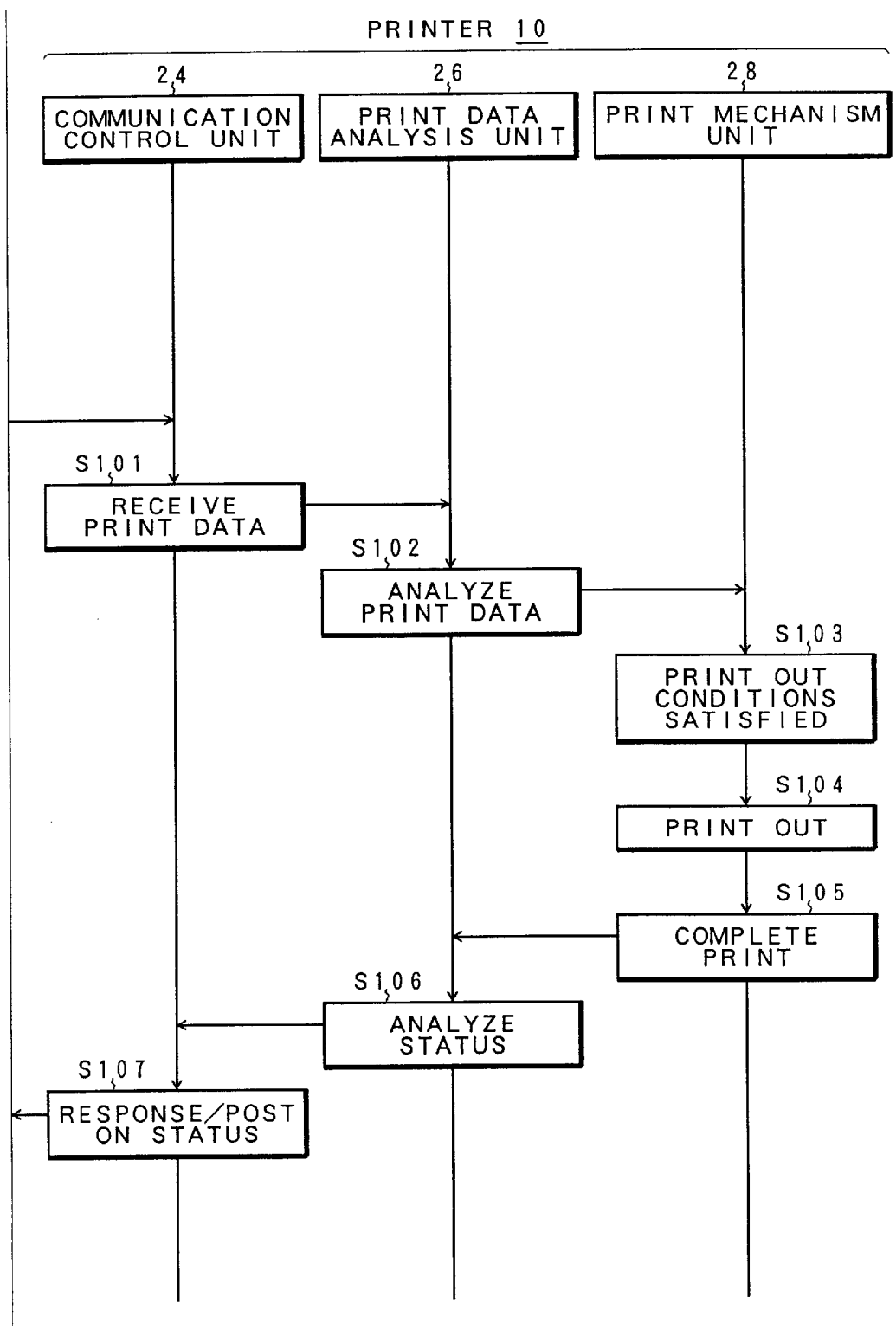

Here, in the embodiments of FIGS. 7, 13 and 20, as shown in the sequence of FIG. 6, asynchronous communication is taken as an example in which the communication control unit 22 on the host 14 side divides the print data on a packet by packet basis for sending a plurality of times and in which printing operation is carried out when the print conditions for the completion of one page have been satisfied on the printer 10 side. This asynchronous communication is under asynchronous communication control in which the packet transfer on the LAN 12 is not synchronous with the printing action on the printer 10 side. On the contrary, the sequence for transferring print data from the host 14 of FIGS. 23A and 23B to the printer 10 for printing is under synchronous communication control allowing the transfer of the print data to be synchronous with the printing action in the printer 10. In the case of the print data transfer under this synchronous communication control, when a print request is given to the application unit 18 of the host 14 as in step S1, the print data generation unit 20 generates print data in step S2 to deliver it to the communication control unit 22, after which in step S3 the print data are divided on a packet by packet basis for the sending to the printer 10. Note that after the completion of generation of all print data, the print data generation unit 20 issues a completion response to the application unit 18 in step S4, to thereby release the application in step S5. In the printer 10, the communication control unit 24 receives a packet as in step S101. The thus received packet is sent to the print data analysis unit 26, which analyzes the print data in step S102 for sending to the print mechanism unit 28, which in turn builds up data for one page. Then, when the print acquisition conditions are satisfied through the completion of data for one page in step S103, print out is performed in step S104. When the printing operation is complete in step S105, state analysis is carried out in step S106, after which a data transfer normal response and a state post of print completion are imparted to the host 14 side in step S107. The communication control unit 22 of the host 14 receives this response and state post in step S6, to complete the print processing. In the network adaptable printer 10 under the synchronous communication control in this manner, it is impossible to perform the processing at the packet level as in the asynchronous communication control, so that there is performed the error recovery on a data byte count basis from the foremost position of the print data according to the third embodiment of FIG. 20.

Figure 24B:
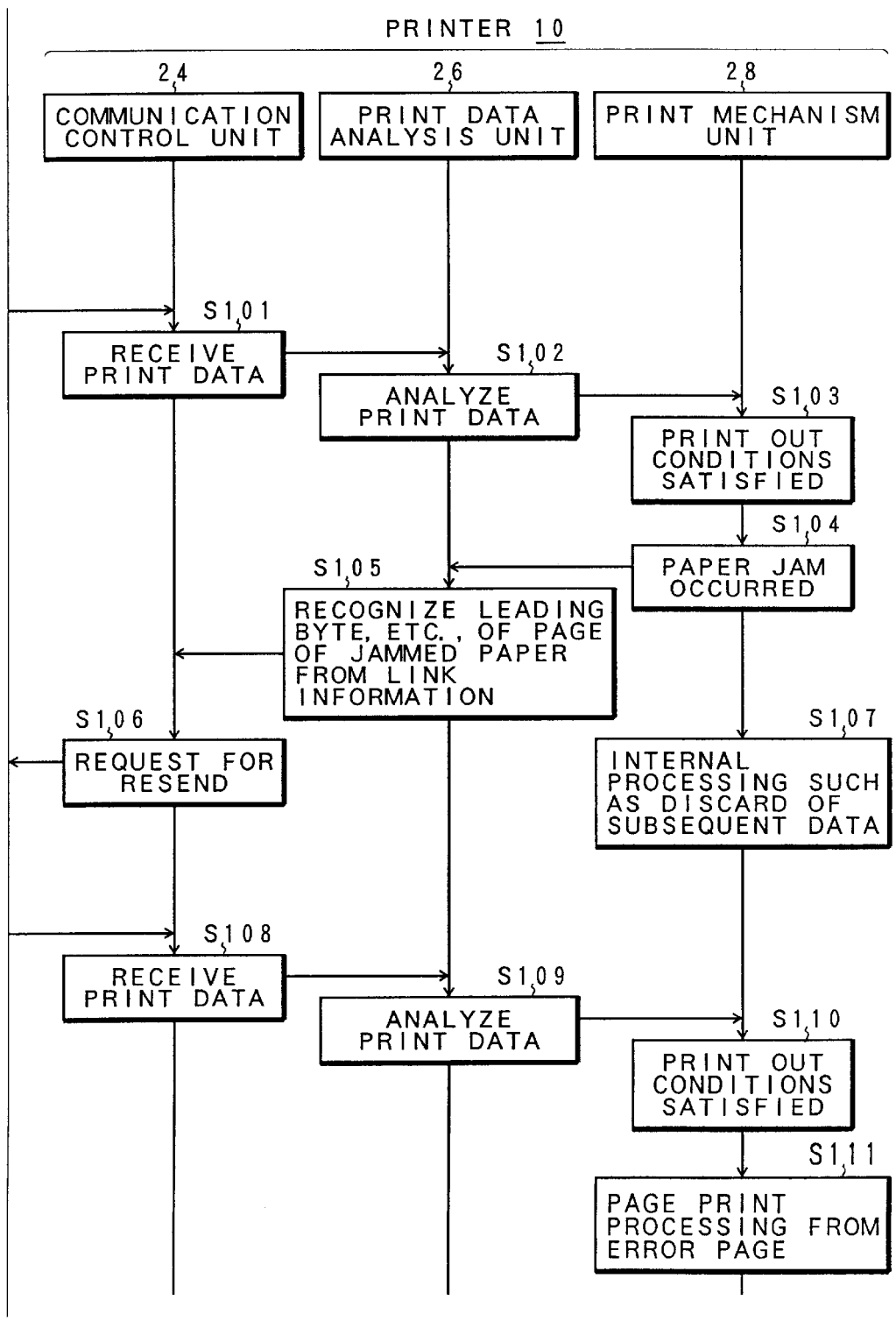

FIGS. 24A and 24B are explanatory diagrams of sequence of resend processing for error recovery on a data byte count basis in cases where an error has occurred during the printing operation under the synchronous communication control. The processing of steps S1 to S5 in the host 14 and of the steps S101 to S103 in the printer 10 is the same as the processing upon the normal action of FIGS. 23A and 23B. However, assume that a paper jam has occurred as in step S104 in the process of the printing operation as a result of establishment of the print out conditions in step S103. On the basis of post on paper jam error, the printer recognizes the foremost byte count on the page of the jammed paper from the link information in step S105, and it issues a resend request to the host 14 in step S106. In the host 14 that has received a resend request, the communication control unit 22 receives the resend request in step S6 and recognizes a foremost byte on the error page from the data byte count from the foremost position of the print data designated by the resend request in step S7, to perform resending of the print data for error recovery. If the print out conditions completed by the page data subjected to the error are satisfied in step S110 by way of the print data reception in step S108 and analysis of print data in step S109 after the resending of the print data, then the reprint out is performed starting from the error page in step S111 to complete the error recovery.

Although the above embodiments employ Ethernet LAN as the network by way of example, the present invention is applicable intactly to appropriate wide area networks such as internets.

Furthermore, the above embodiments store as the link information the correlations between the packet count, byte count and page count on the printer side for use in resending request for error recovery. At that time, the correlations with the packet count and byte count may be stored as link information on a line by line basis in lieu of the page by page basis to perform resend request for error recovery.

Moreover, the present invention provides a computer readable recording medium having a printer control program stored therein. The recording medium is provided which stores the printer control program for implementing the functions of the print protocol control unit equipped with functions of the first embodiment of FIG. 7, the second embodiment of FIG. 13 and the third embodiment of FIG. 20.

Embodiments of the computer readable recording medium having the printer control program stored therein include a removable transportable storage medium such as a CD-ROM or a floppy disk, a storage device for program providers that provide programs through lines, and a memory device such as a RAM and a hard disk for processors having programs installed therein. The printer control program provided by the storage medium is loaded into the printer for run on its memory.

According to the present invention as set forth herein above, when an error such as paper jam has occurred in the network adaptable printer and therefore a request for resend of print data has been issued to the host for recovery, there is eliminated a need for the host side to recognize pages on the printer side through reference to print data, thereby achieving easy and rapid error recovery.

What is claimed is:

1. A printer apparatus for printing out in sequence, on a page to page basis, print packet data transferred from a host associated by way of a network, said printer apparatus comprising:

a link information creation unit which, every time receiving print packet data from said host, creates and saves link information indicative of a correlation between a transfer packet position on the host side of said print packet data received and a page position on the printer side; and a resend request unit which, when a print error has occurred during the print out, recognizes from said link information a transfer packet position on the host side corresponding to a page position at which said printer error has occurred, to thereby issue a resend request to said host, wherein:

said link information creation unit creates and saves link information indicative of a correlation between a transfer data position on the host side and a line position on the printer side; and wherein said link information creation unit, when a print error such as paper jam has occurred during the print out, recognizes a transfer data position on the host side corresponding to a line at which said print error has occurred, to thereby issue a request for resend.

2. An apparatus according to claim 1, wherein said link information creation unit includes:

a packet counter for counting the packet count every time receiving a packet containing print data from said host;

a page counter for counting the page count every time creating print data on a page by page basis through combination of print data contained in said packet received; and a control memory for storing as link information the packet count of said packet counter and the page count of said page counter; and wherein said resent request unit recognizes from said link information a packet position on said network corresponding to the foremost position of a print page subject to said print error, to thereby issue a request to said host for resent of print data.

3. An apparatus according to claim 2, wherein said link information creation unit further includes an offset counter for counting the offset indicative of a position of print data within a packet, said link information creation unit, when print data obtained from a received packet are separated into an endmost portion of the current page and a foremost portion of the next page, saving link information on the page count of the current page and the packet count of the received packet into said control memory, said link information creation unit further saving link information on the page count of the next page, the packet number of the same received packet and the offset value of said offset counter into said memory; and wherein said resend request unit, when a print error has occurred during the print out of a page having at its foremost position partial print data of said received packet, recognizes from said link information a packet position on said network corresponding to said page subjected to said error and a transfer start position within said packet, to thereby issue a request to said host for resend of print data.

4. An apparatus according to claim 1, wherein said link information creation unit, every time receiving print data from said host, creates and saves link information indicative of a correlation between a packet position, in the application layer of said host, of received print data and a print data position, and wherein said link information creation unit, when a print error such as paper jam has occurred during the print out, recognizes from said link information a packet position in said application layer corresponding to a print data position at which said print error has occurred, to issue a request to said host for resend of print data starting from said packet position recognized.

5. An apparatus according to claim 4, wherein
said link information creation unit includes:
an application packet counter for counting every time receiving separated print data from said host to consequently obtain print data having the data length of an application layer packet on the host side;
a page counter for counting the page count every time creating print data on a page by page basis through combination of said print data received; and
a control memory for storing as link information the packet count of said application packet counter and the page count of said page counter; and wherein
said resend request unit recognizes from said link information an application packet position on the host side corresponding to the foremost position of a print page at which said print error has occurred, to thereby issue a request to said host for resend of print data.

6. An apparatus according to claim 5, wherein
said link information creation unit further includes an offset counter for counting the offset indicative of a data position within an application packet on the host side, said link information creation unit, when print data of a received application packet are separated into an endmost portion of the current page and a foremost portion of the next page, saving link information on the page count of the current page and the packet count of said received application packet into said control memory, said link information creation unit further saving link information on the page count of the next page, the packet number of the same received application packet and the offset value of said offset counter into said memory; and wherein
said resend request unit, when a print error has occurred during the print out of a page having at its foremost position partial data of said received application packet, recognizes from said link information an application packet position corresponding to said page at which said error has occurred and a transfer start position within said packet, to thereby issue a request to said host for resend of print data.

7. An apparatus according to claim 1, wherein
said link information creation unit, every time receiving print data from said host, creates and saves link information indicative of a correlation between a transfer data position on the host side and a print data position on the printer side, and wherein
said link information creation unit, when a print error such as paper jam has occurred during the print out, recognizes from said link information a position from the head of host side transfer data corresponding to a print data position at which said print error has occurred, to issue a request to said host for resend of print data starting from said position recognized.

8. An apparatus according to claim 7, wherein
said link information creation unit includes:
a byte counter which, every time receiving print data from said host, counts the byte count from the foremost position of said print data;
a page counter which counts the page count every time creating print data on a page by page basis through combination of said print data received; and
a control memory which stores as link information the byte count of said byte counter and the page count of said page counter; and wherein
said resend request unit recognizes from said link information the byte count from the foremost position of said print data corresponding to the foremost position of a print page at which said print error has occurred, to thereby issue a request to said host for resend of print data.

9. An apparatus according to claim 1, wherein control for printing out on the printer side is provided in synchronism with control for print data transfer from said host.

10. An apparatus according to claim 1, wherein control for printing out on the printer side is provided in asynchronism with control for print data transfer from said host.

11. A method of controlling a printer apparatus serving to print out in sequence, on a desired print data length basis, print data transferred from a host associated by way of a network, said method comprising:
a link information creation step in which, every time receiving print data from said host, link information is created and saved which is indicative of a correlation between a transfer data position on the host side of said print data received and a print data position on the printed side; and
a resend request step in which, when a print error such as paper jam has occurred during the print out, there is recognized from said link information a transfer data position on the host side corresponding to a print data position at which said print error has occurred, so that a resend request to said host is issued, wherein:
said link information creation step creates and saves link information indicative of a correlation between a transfer data position on the host side and a line position on the printer side; and wherein
said link information creation step, when a print error such as paper jam has occurred during the print out, recognizes a transfer data position on the host side corresponding to a line at which said print error has occurred, to thereby issue a request for resend.

12. A storage medium comprising:
a reception module for receiving print data transferred from a host associated by way of a network;
a link information creation module which, every time receiving print data from said host, creates and saves link information indicative of a correlation between a transfer data position on the host side of said print data received and a print data position on the printer side; and
a resend request module, which when a print error such as paper jam has occurred during the print out, recognizes from said link information a transfer data position on the host side corresponding to a print data position at which said print error has occurred, to thereby issue a resend request to said host, wherein:
said link information creation module creates and saves link information indicative of a correlation between a transfer data position on the host side and a line position on the printer side; and wherein
said link information creation module, when a print error such as paper jam has occurred during the print out, recognizes a transfer data position on the host side corresponding to a line at which said print error has occurred, to thereby issue a request for resend.

13. A printer system comprising:
a network;
a host which transfers packet print data via said network;
and a printer apparatus connected to said host via said network, said printer apparatus printing out a plurality of packet print data received from said host, in the form of a desired print page data;

said printer apparatus comprising:

a link information creation unit which, every time receiving packet print data from said host, creates and saves link information indicative of a correlation between the packet number of said received packet print data and the print page; and a resend request unit which, when a print error has occurred during the print out, recognizes from said link information the foremost packet number of the print page where said print error has occurred, to issue a request for resend to said host;

wherein said host comprises a resend unit which upon receipt of said request for resend from said printer apparatus, resends packet print data from the position of the packet number requested, wherein:

said link information creation unit creates and saves link information indicative of a correlation between a transfer data position on the host side and a line position on the printer side; and wherein said link information creation unit, when a print error such as paper jam has occurred during the print out, recognizes a transfer data position on the host side corresponding to a line at which said print error has occurred, to thereby issue a request for resend.

* * * * *